United States Patent
Gaikwad et al.

(10) Patent No.: US 8,300,890 B1
(45) Date of Patent: Oct. 30, 2012

(54) PERSON/OBJECT IMAGE AND SCREENING

(75) Inventors: Deepak Gaikwad, Pune (IN); Radhika Walimbe, Pune (IN); Chandan Gope, Cupertino, CA (US); Vaidhi Nathan, San Jose, CA (US)

(73) Assignee: Intellivision Technologies Corporation, San Jose, CA (US)

( * ) Notice: Subject to any disclaimer, the term of this patent is extended or adjusted under 35 U.S.C. 154(b) by 469 days.

(21) Appl. No.: 12/459,073

(22) Filed: Jun. 25, 2009

Related U.S. Application Data

(63) Continuation-in-part of application No. 12/011,705, filed on Jan. 28, 2008, now abandoned, which is a continuation-in-part of application No. 12/072,186, filed on Feb. 25, 2008.

(60) Provisional application No. 60/898,341, filed on Jan. 29, 2007, provisional application No. 60/898,472, filed on Jan. 30, 2007, provisional application No. 60/898,603, filed on Jan. 30, 2007, provisional application No. 61/133,218, filed on Jun. 25, 2008, provisional application No. 61/133,215, filed on Jun. 25, 2008, provisional application No. 61/133,259, filed on Jun. 26, 2008, provisional application No. 60/903,026, filed on Feb. 23, 2007.

(51) Int. Cl.
*G06K 9/00* (2006.01)

(52) U.S. Cl. ........................................ 382/103; 382/173

(58) Field of Classification Search .................. 382/103
See application file for complete search history.

(56) References Cited

U.S. PATENT DOCUMENTS

| | | | | |
|---|---|---|---|---|
| 6,130,964 A * | 10/2000 | Marques et al. | ............... | 382/236 |
| 6,411,209 B1 * | 6/2002 | Lyons et al. | .................. | 340/541 |
| 6,411,744 B1 * | 6/2002 | Edwards | ....................... | 382/294 |
| 6,545,706 B1 * | 4/2003 | Edwards et al. | ............... | 348/169 |
| 6,670,963 B2 * | 12/2003 | Osberger | ....................... | 345/629 |
| 6,909,455 B1 * | 6/2005 | Edwards et al. | ............... | 348/169 |
| 7,224,852 B2 * | 5/2007 | Lipton et al. | .................. | 382/294 |
| 7,859,564 B2 * | 12/2010 | Kelly et al. | .................... | 348/143 |
| 2002/0037103 A1 * | 3/2002 | Hong et al. | .................... | 382/173 |
| 2002/0102024 A1 * | 8/2002 | Jones et al. | .................... | 382/225 |
| 2002/0118880 A1 * | 8/2002 | Liu et al. | ....................... | 382/199 |
| 2002/0126891 A1 * | 9/2002 | Osberger | ....................... | 382/165 |
| 2002/0159643 A1 * | 10/2002 | DeYong et al. | ............... | 382/228 |
| 2003/0053692 A1 * | 3/2003 | Hong et al. | .................... | 382/171 |
| 2003/0103647 A1 * | 6/2003 | Rui et al. | ....................... | 382/103 |
| 2003/0156759 A1 * | 8/2003 | Colmenarez et al. | ......... | 382/228 |
| 2004/0001612 A1 * | 1/2004 | Gutta et al. | .................... | 382/107 |
| 2004/0096102 A1 * | 5/2004 | Handley | ....................... | 382/164 |
| 2004/0151342 A1 * | 8/2004 | Venetianer et al. | ........... | 382/103 |
| 2004/0151374 A1 * | 8/2004 | Lipton et al. | .................. | 382/181 |
| 2004/0228530 A1 * | 11/2004 | Schwartz et al. | ............. | 382/173 |
| 2004/0246336 A1 * | 12/2004 | Kelly et al. | .................... | 348/143 |
| 2005/0129278 A1 * | 6/2005 | Rui et al. | ....................... | 382/103 |
| 2006/0285747 A1 * | 12/2006 | Blake et al. | .................... | 382/180 |
| 2008/0181507 A1 * | 7/2008 | Gope et al. | .................... | 382/190 |
| 2008/0219558 A1 * | 9/2008 | Lu et al. | ....................... | 382/190 |
| 2009/0226044 A1 * | 9/2009 | Ngan et al. | .................... | 382/115 |

* cited by examiner

*Primary Examiner* — Sath V Perungavoor
(74) *Attorney, Agent, or Firm* — David Lewis

(57) ABSTRACT

A first set of unknown pixels is determined for which being located in the foreground portion does not in-and-of-itself determine the pixel to be part of the foreground. A second set of unknown pixels is determined for which being in a current background portion does not in-and-of-itself determine the pixel to be part of the background. A determination is made for the first and second set of unknown pixels whether the pixel is part of the background or foreground based on temporal data. Extracting an image of the foreground that does not include the current background based on the determination of whether the pixel is part of the foreground, the current background, and temporal data. In an embodiment, the system can use multiple types of sensors to determine whether an entity is a likely security risk.

14 Claims, 19 Drawing Sheets

PERSON/OBJECT IMAGE AND SCREENING

CROSS-REFERENCE TO RELATED APPLICATIONS

Application No. 60/898,341, filed Jan. 29, 2007, which is incorporated herein by reference; this application also claims priority benefit of U.S. Provisional Patent Application No. 60/898,472, filed Jan. 30, 2007, which is incorporated herein by reference; and this application claims priority benefit of U.S. Provisional Patent Application No. 60/898,603, filed Jan. 30, 2007, which is incorporated herein by reference. This application claims priority benefit of U.S. Provisional Patent Application No. 61/133,218, entitled, "Object Detection for Person Screening Systems," by Alexander Brusin, filed Jun. 25, 2008, which is incorporated herein by reference; this application also claims priority benefit of U.S. Provisional Patent Application No. 61/133,215, entitled, "High Resolution Image or Video Enhancement," by Alexander Bovyrin, filed Jun. 25, 2008, which is incorporated herein by reference; and this application also claims priority benefit of U.S. Provisional Patent Application No. 61/133,259, entitled, "An Advanced Architecture and Software Solution for Person/Object Screening Imaging Systems," by Deepak Gaikwad, filed Jun. 26, 2008, which is incorporated herein by reference; this application is also a continuation in-part of U.S. patent application Ser. No. 12/011,705, entitled, "Image Manipulation for Videos and Still Images,", filed Jan. 28, 2008 now abandoned by Chandan Gope et al.; U.S. patent application Ser. No. 12/011,705, which claims priority benefit of U.S. Provisional Patent Application No. 60/898,341, filed Jan. 29, 2007, which are incorporated herein by reference; U.S. patent application Ser. No. 12/011,705 also claims priority benefit of U.S. Provisional Patent Application No. 60/898,472, filed Jan. 30, 2007, which is also incorporated herein by reference; and U.S. patent application Ser. No. 12/011,705 claims priority benefit of U.S. Provisional Patent Application No. 60/898,603, filed Jan. 30, 2007, which is also incorporated herein by reference; this application is also a continuation in part of U.S. patent application Ser. No. 12/072,186, entitled An Image and Video Stitching and Viewing Method and System," filed Feb. 25, 2008, by Alexander Kuranov et al., which in turn claims priority benefit of U.S. Provisional Patent Application No. 60/903,026, filed Feb. 23, 2007, which are incorporated herein by reference.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Security screening may be desirable and may be conducted in many contexts. Sensors for detecting particulates and/or gases in the air may be useful, but are not in-of-themselves adequate.

BRIEF DESCRIPTION

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In an embodiment, an image is received having a first portion and one or more other portions. The one or more other portions are replaced with one or more other images. The replacing of the one or more portions results in an image including the first portion and the one or more other images. In an embodiment, the background of an image is replaced with another background. In an embodiment, the foreground is extracted by identifying the background based on an image of the background without any foreground. In an embodiment, the foreground is extracted by identifying portions of the image that have characteristics that are expected to be associated with the background and characteristics that are expected to be associated with foreground. In an embodiment any of the images can be still images. In an embodiment, any of the images are video images.

A system for person or object screening system may be accomplished as disclosed having multiple imaging sensors, such as Millimeter-Wave, Infra-Red, thermal, video, Terahertz, and X-Ray systems are integrated. The system can use multiple types of sensors to determine whether an entity is a likely security risk. The system may include a data acquisition and management sub-system, and/or an automatic object detection and classification system. The system may include a display and a multi-sensor data fusion. The system may include an event management sub-system, analytics and measurements, network streaming, tamper detection, remote monitoring and client viewing and operations, a database of events, and a search engine. The system may be capable of joining the output of multiple cameras as panoramas, and/or the joining the output of multiple cameras/sensors into 1 unified interface. The system may be incorporated within a camera or within a device similar to a networked IP device.

Figure 1A:
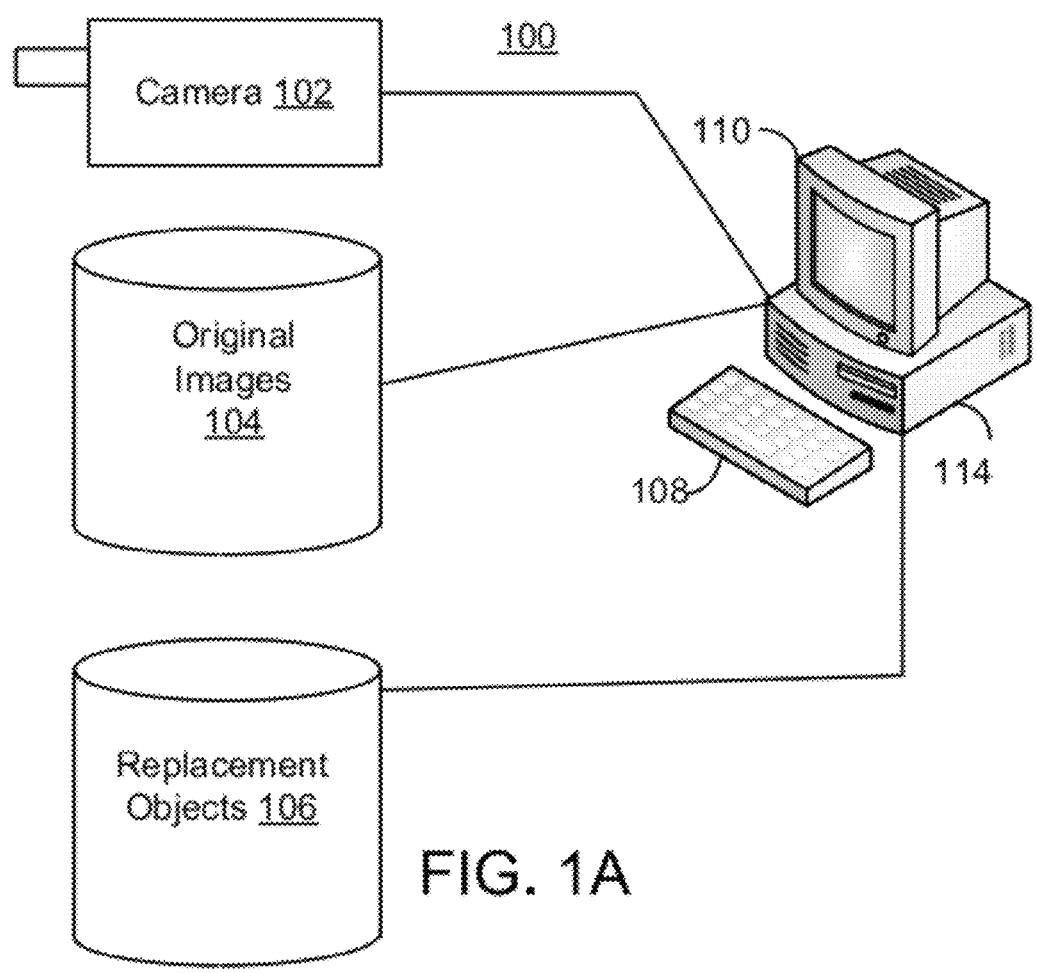
FIG. 1A shows an embodiment of a system for manipulating images.
Figure 1B:
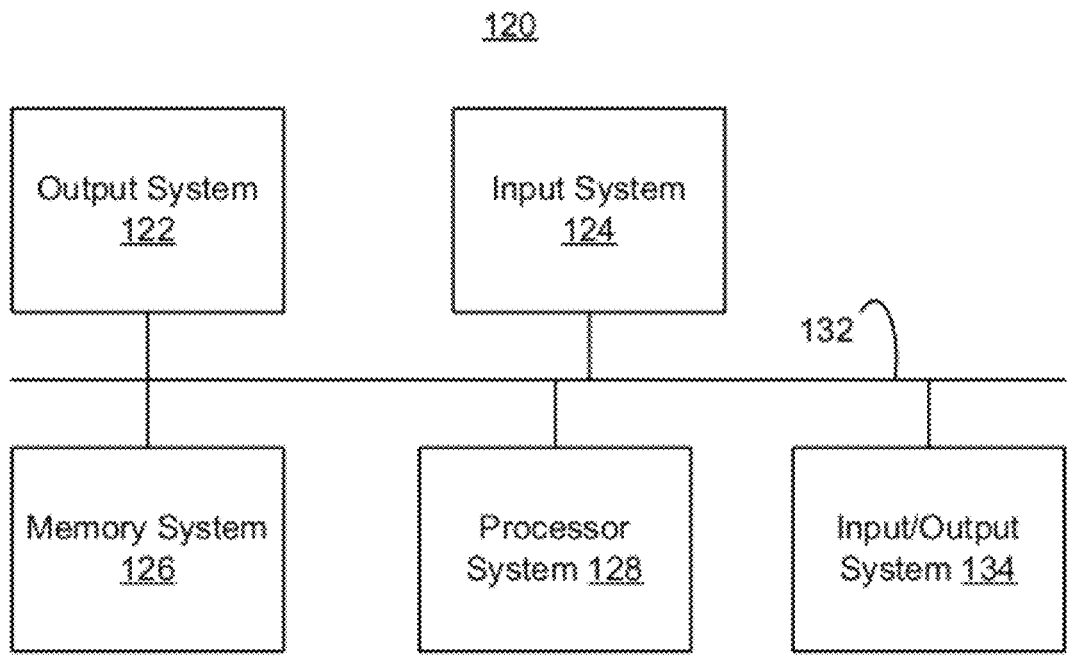
FIG. 1B shows a block diagram of the system of FIG. 1A.
Figure 1C:
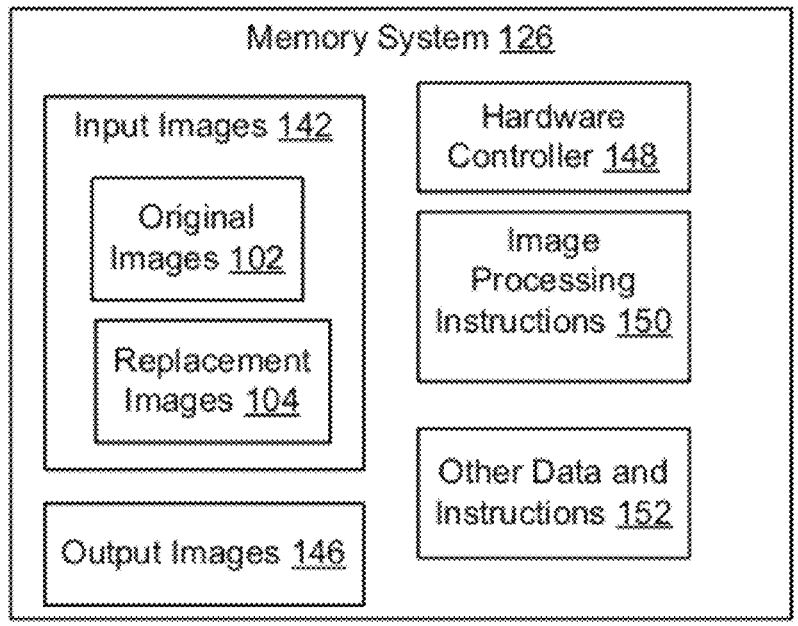
FIG. 1C is a block diagram of an embodiment of the memory system of FIG. 1B.

In general, at the beginning of the discussion of each of FIGS. 1A-C is a brief description of each element, which may have no more than the name of each of the elements in one of FIGS. 1A-C that is being discussed. After the brief description of each element, each element is further discussed in numerical order. In general, each of FIGS. 1A-17 is discussed in numerical order and the elements within FIGS. 1A-17 are also usually discussed in numerical order to facilitate easily locating the discussion of a particular element. Nonetheless, there is no one location where all of the information of any element of FIGS. 1A-17 is necessarily located. Unique information about any particular element or any other aspect of any of FIGS. 1A-17 may be found in, or implied by, any part of the specification. FIG. 1A shows an embodiment of a system 100 for manipulating images. System 100 may include camera 102, original images 104, replacement objects 106, output device 108, input device 110, and processing system 112. In other embodiments, system 100 may not have all of the elements listed and/or may have other elements instead of or in addition to those listed.

Camera 102 may be a video camera, a camera that takes still images, or a camera that takes both still and video images. Camera 102 may be used for photographing images containing a foreground of interest and/or photographing images having a background or other objects of interest. The images taken by camera 102 are either altered by system 100 or used by system 100 for altering other images. Camera 102 is optional.

Original images 104 is a storage area where unaltered original images having a foreground of interest are stored. Original images 104 may be used as an alternative input to camera 102 for capturing foreground images. In an embodiment, foreground images may be any set of one or more images that are extracted from one scene and inserted into another scene. Foreground images may include images that are the subject of the image or the part of the image that is primary focus of attention for the viewer. For example, in a video about people, the foreground images may include one or more people, or may include only those people that form the main characters of image. The foreground is what the image is about. Original images 104 are optional. Images taken by camera 102 may be used instead of original images 104.

Replacement objects 106 is a storage area where images of objects that are intended to be used to replace other objects in original images 104. For example, replacement images 106 may include images of backgrounds that are intended to be substituted for the backgrounds in original images 104. The background of an image is the part of the image that is not the foreground. Replacement images 106 may also include other objects, such as caricatures of faces or people that will be substituted for the actual faces or people in an image. In an embodiment, replacement images 106 may also include images that are added to a scene, that were not part of the original scene, the replacement object may be a foreground object or part of the background. For example, replacement images 106 may include images of fire hydrants, cars, military equipment, famous individuals, buildings, animals, fictitious creatures, fictitious equipment, and/or other objects that were not in the original image, which are added to the original image. For example, an image of a famous person may be added to an original image or to a background image along with a foreground to create the illusion that the famous person was standing next to a person of interest and/or in a location of interest.

Input device 108 may be used for controlling and/or entering instructions into system 100. Output device 110 may be used for viewing output images of system 100 and/or for viewing instructions stored in system 100.

Processing system 112 processes input images by combining the input images to form output images. The input images may be from camera 102, original images 104, and/or replacement images 106. Processor 112 may take images from at least two sources, such as any two of camera 102, original images 104, and/or replacement images 106.

In an embodiment, processing system 112 may separate portions of an image from one another to extract foreground and/or other elements. Separating portions of an image may include extracting objects and people of interest from a frame. The extracted objects and/or people may be referred to as the foreground. The foreground extraction can be done in one or more of three ways. One way that the foreground may be extracted is by identifying or learning the background, while the image does not have other objects present, such as during an initial period in which the background is displayed without the foreground. Another way that the foreground may be extracted is by identifying or learning the background even with other objects present and using object motion to identify the other objects in the image that are not part of the background. Another way that the foreground may be extracted is by intelligently extracting the objects from single frames without identifying or learning background.

Although FIG. 1A depicts camera 102, original images 104, replacement objects 106, output device 108, input device 110, and processing system 112 as physically separate pieces of equipment any combination of camera 102, original images 104, replacement objects 106, output device 108, input device 110, and processing system 112 may be integrated into one or more pieces of equipment. For example, original images 104 and replacement objects 106 may be different parts of the same storage device. In an embodiment, original images 104 and replacement objects 106 may be different storage locations within processing system 112. In an embodiment, any combination of camera 102, original images 104, replacement objects 106, output device 108, input device 110, and processing system 112 may be integrated into one piece of equipment that looks like an ordinary camera.

FIG. 1B shows a block diagram 120 of system 100 of FIG. 1A. System 100 may include output system 122, input system 124, memory system 126, processor system 128, communications system 132, and input/output device 134. In other embodiments, block diagram 120 may not have all of the elements listed and/or may have other elements instead of or in addition to those listed.

Architectures other than that of block diagram 120 may be substituted for the architecture of block diagram 100. Output system 122 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. In an embodiment, output system 122 may also include an output storage area for storing images, and/or a projector for projecting the output and/or input images.

Input system 124 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 124 may include camera 102 and/or a port for uploading images.

Memory system 126 may include, for example, any one of, some of, any combination of, or all of a long term storage system, such as a hard drive; a short term storage system, such as random access memory; a removable storage system, such as a floppy drive or a removable USB drive; and/or flash memory. Memory system 126 may include one or more machine readable mediums that may store a variety of different types of information. The term machine-readable medium is used to refer to any medium capable of carrying information that is readable by a machine. One example of a machine-readable medium is a computer-readable medium. Another example of a machine-readable medium is paper having holes that are detected that trigger different mechanical, electrical, and/or logic responses. Memory system 126 may include original images 104, replacement images 106, and/or instructions for processing images. All or part of memory 126 may be included in processing system 112. Memory system 126 is also discussed in conjunction with FIG. 1C, below.

Processor system 128 may include any one of, some of, any combination of, or all of multiple parallel processors, a single processor, a system of processors having one or more central processors and/or one or more specialized processors dedicated to specific tasks. Optionally, processing system 128 may include graphics cards and/or processors that specialize in, or are dedicated to, manipulating images and/or carrying out of the methods FIGS. 2-7. Processor system 128 is the system of processors within processing system 112.

Communications system 132 communicatively links output system 122, input system 124, memory system 126, processor system 128, and/or input/output system 134 to each other. Communications system 132 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 134 may include devices that have the dual function as input and output devices. For example, input/output system 134 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 134 is optional, and may be used in addition to or in place of output system 122 and/or input device 124.

FIG. 1C is a block diagram of an embodiment of memory system 126. Memory system 126 includes original images 104, replacement objects 106, input images 142, output images 146, hardware controller 148, image processing instructions 150, and other data and instructions 152. In other embodiments, memory system 126 may not have all of the elements listed and/or may have other elements instead of or in addition to those listed.

Original images 104 and replacement objects 106 were discussed above in conjunction with FIG. 1A. Input images 142 is a storage area that includes images that are input to system 100 for forming new images, such as original images 104 and replacement objects 106. Output images 146 is a storage area that include images that are formed by system 100 from input images 142, for example, and may be the final product of system 100. Hardware controller 148 stores instructions for controlling the hardware associated with system 100, such as camera 102 and output system 110. Hardware controller 148 may include device drivers for scanners, cameras, printers, a keyboard, projector, a keypad, mouse, and/or a display. Image processing instructions 150 include the instructions the implement the methods described in FIGS. 2-7. Other data and instructions 152 include other software and/or data that may be stored in memory system 126, such as an operating system or other applications.

Switching Backgrounds

Figure 2:
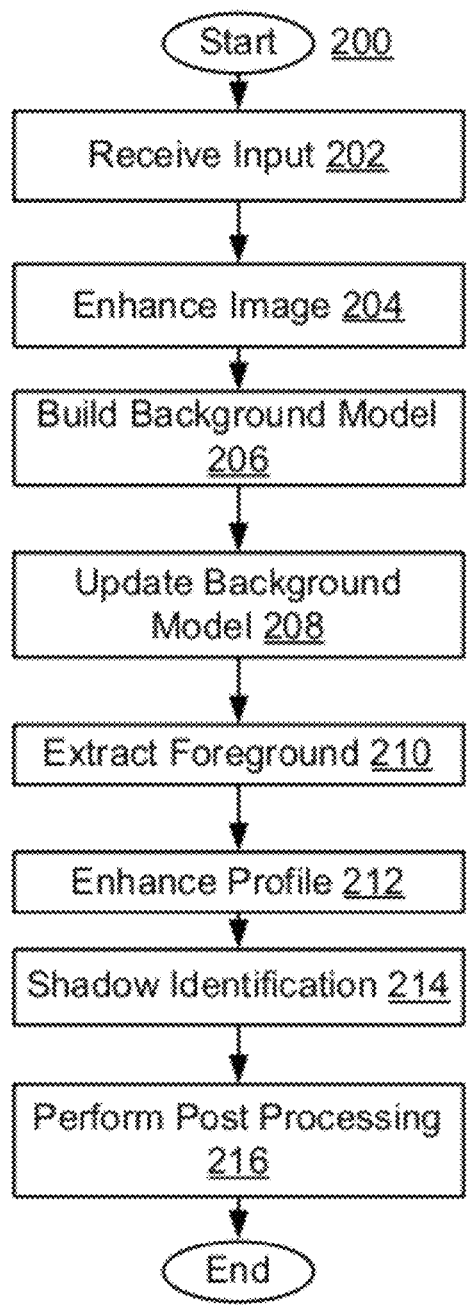
FIG. 2 is a flowchart of an embodiment of a method for manipulating images.

FIG. 2 is a flowchart of an embodiment of method 200 of manipulating images. Method 200 has at least three variations associated with three different cases. In an embodiment, videos (live or offline) may be the input (not only may still images be used for input for the foreground and/or background, but video images may be used for input). The input to this system can be in the form of images (in an embodiment, the images may have any of a variety of formats including but not limited to bmp, jpg, gif, png, tiff, etc.). In an embodiment, the video clips may be in one of various formats including but not limiting to avi, mpg, wmv, mov, etc.

In an embodiment, video or still images (live or offline) may be the output. In an embodiment, only one video input is required (not two). The same input video may define scenes, without a person initially being present, from which a background model may be based. In an embodiment, an intelligent background model is created that adapts to changes in the background so that the background does not need to be just one fixed image. The background model is intelligent in that the background model automatically updates parameters associated with individual pixels and/or groups of pixels as the scene changes. The system may learn and adapt to changing background conditions, whether or not the changes are related to lighting changes or related to the introduction/removal of inanimate or other objects. The complexity of the image processing algorithms may be determined based on a scene's complexity and/or specific features. If the scene or input images have more edges, more clutter have more overlapping objects, changes in shadows, and/or lighting changes. In more complex scenes, the algorithm is more complex in that more convolution filters are applied, more edge processing is performed, and/or object segmentation methods may be applied to separate the boundary of various objects. The more complex algorithm may learn and/or store more information that is included in the background model. Since the image is more complex, more information and/or more calculations may be required to extract the foreground in later sages. In an embodiment, both the background and foreground images may be videos. In an embodiment, the background may be exchanged in real-time or off-line. In an embodiment, the boundary of a foreground element is blended with the background for realism. In an embodiment, the foreground elements may be multiple people and/or other objects as well.

Case I is a variation of method 200 for extracting the foreground (e.g., a person) in a situation in which there is an initial background available that does not show the foreground. The methods of case I can be applied to a video or to a combination of at least two still images in which at least one of the still images has a foreground and background and at least one other still image just has the background.

Initially, while starting or shortly after starting, a "video-based scene changing" operation may be performed, the system may learn the background and foreground (e.g., can identify the background and the person) by receiving images of the background with and without the foreground, which may be obtained in one of at least two ways. In one method, initially the foreground is not present in the scene, and the system may automatically detect that the foreground is not present, based on the amount and/or type of movements if the foreground is a type of object that tends to move, such as a person or animal. If the foreground is a type of object that does not move, the foreground may be detected by the lack of movement. For example, if the foreground is inanimate or if the background moves past the foreground in a video image (to convey the impression that the foreground is traveling) the background images may be detected by determining the value for the motion. Alternatively, the user presses a button to indicate that the foreground (which may be the user) is leaving the scene temporarily (e.g., for a few seconds or a few minutes), giving an opportunity for the system to learn the scene. The system may analyze one or more video images of the scene without the foreground present, which allows the system to establish criteria for identifying pixels that belong to the background. Based on the scene without the foreground element of interest, a "background model" is constructed, which may be based on multiple images. From these images data may be extracted that is related to how each pixel tends to vary in time. The background model is constructed from the data about how each background pixel varies with time. For example, the background model may include storing one or more of the following pieces of information about each pixel and/or about how of the following information changes over time: minimum intensity, maximum intensity, mean intensity, the standard deviation of the intensity, absolute deviation from the mean intensity, the color range, information about edges within the background, texture information, wavelet information with neighborhood pixels, temporal motion, and/or other information.

Case II is a variation of method 200 for extracting a foreground in a situation in which no initial image is available without the foreground. For example, the foreground is already in the scene in the initial image and may be in the scene during all frames. The method of case II can be applied to a video or to a single still image or a set of still images having a background and foreground. In cases I and II the camera is mounted in a fixed manner, such as on a tripod so that the camera does not shake while the pictures are being taken. Case III is a variation of method 200 for extracting the foreground from the background in situations in which the camera is shaking or mobile while taking pictures. The method of case III can be applied to a video or to two still images of the same background and foreground, except the background and foreground have changed.

In step 202 data is input into system 100. In cases I and II in which the camera is fixed, the data that is input may be a live or recorded video stream from a stationary camera.

In case III in which the camera is not fixed, the data input may also be a live or recorded video stream from a non-stationary camera in which the camera may have one location but is shaking or may be a mobile camera in which the background scene changes continuously.

In step 204, the data is preprocessed. In an embodiment of cases I, II, and III, method 200 may handle a variety of qualities of video data, from a variety of sources. For example, a video stream coming from low-resolution CCD sensors is generally poor in quality and susceptible to noise. Preprocessing the data with the data pre-processing module makes the method robust to data quality degradations. Since most of the noise contribution to the data is in the high frequency region of the 2D Fourier spectrum, noise is suppressed by intelligently eliminating the high-frequency components. The processing is intelligent, because not all of the high frequency elements of the image are removed. In an embodiment, high frequency elements are removed that have characteristics that are indicative of the elements being due to noise. Similarly, high frequency elements that have characteristics that are indicative that the element is due to a feature of the image that is not an artifact are not removed. Intelligent processing may be beneficial, because true edges in the data also occupy the high-frequency region (just like noise). Hence, an edge map may be constructed, and an adaptive smoothing is performed, using a Gaussian kernel on pixels within a region at least partially bounded by an edge of the edge map. The values associated with pixels that are not part of the edges may be convolved with a Gaussian function. The edges may be obtained by the Canny edge detection approach or another edge detection method.

There are many different methods that may be used for edge detection in combination with the methods and systems described in this specification. An example of just one edge detection method that may be used is Canny edge detector. A Canny edge detector finds image gradients to highlight regions with high spatial derivatives. The algorithm then tracks along these regions and suppresses any pixel that is not at the maximum gradient (this process may be referred to as non-maximum suppression). The gradient array is now further reduced by hysteresis. Hysteresis is used to track the remaining pixels that have not been suppressed. Hysteresis uses two thresholds and if the magnitude is below the first threshold, the edge value associated with the pixel is set to zero (made a non-edge). If the magnitude is above the high threshold, it is made an edge. Also, if the magnitude lies between the two thresholds, then it is set to zero unless there is a path from this pixel to a pixel with a gradient above the second threshold.

In order to implement the Canny edge detector algorithm, a series of steps may be followed. The first step may be to filter out any noise in the original image before trying to locate and detect any edges, which may be performed by convolving a Gaussian function with the pixel values. After smoothing the image and eliminating the noise, the next step is to find the edge strength by taking the gradient of the image in the x and y directions. Then, the approximate absolute gradient magnitude (edge strength) at each point can be found. The x and y gradients may be calculated using Sobel operators, which are a pair of 3×3 convolution masks, one estimating the gradient in the x-direction (columns) and the other estimating the gradient in the y-direction (rows).

The magnitude, or strength of the gradient is then approximated using the formula:

$$|G|=|Gx|+|Gy|$$

The x and y gradients give the direction of the edge. In an embodiment, whenever the gradient in the x direction is equal to zero, the edge direction has to be equal to 90 degrees or 0 degrees, depending on what the value of the gradient in the y-direction is equal to. If Gy has a value of zero, the edge direction will equal 0 degrees. Otherwise the edge direction will equal 90 degrees. The formula for finding the edge direction is just:

$$[\theta=\tan-1(Gy/Gx)$$

Once the edge direction is known, the next step is to relate the edge direction to a direction that can be traced in an image.

After the edge directions are known, non-maximum suppression now has to be applied. Non-maximum suppression is used to trace the edge in the edge direction and suppress the pixel value of any pixel (by setting the pixel to 0) that is not considered to be an edge. This will give a thin line in the output image. Finally, hysteresis is applied to further improve the image of the edge.

In step 206, a background model is constructed. In the variation of method 200 of case I in which the background is photographed without the foreground, method 200 uses the image of the background without the foreground to build the background model. Visual cues of multiple features may be computed from the raw (e.g., unaltered) pixel data. The features that may be used for visual cues are luminance, chrominance, the gradient of pixel intensity, the edges, and the texture. The visual cues may include information about, or indications of, what constitutes an object, the boundary of the object and/or the profile of the object. Alternatively or additionally, the visual cues may include information to determine whether a pixel and/or whether the neighborhood and/or region of the scene belongs to the background of the scene or to the foreground object. The visual cues and the other information gathered may be used to decide whether to segment an object and decide if a pixel that probably belongs to a foreground based on the edge boundary or belongs to the background. A background model for each of the features of the background may be accumulated over a few initial frames of a video or from one or more still images of the background.

In case II, in which the background is not available without the foreground, an alternative approach is required. Motion pixels are detected in the frame to decide which region corresponds to the foreground. The motion may be estimated using near frame differencing and optical flow techniques. If the motion is not much or if the foreground is not moving or in a still image, and if the foreground is a person, then skin detection may be employed to locate the pixels that belong to a person. Skin detection is performed by analyzing the hue component of pixels in HSV color-space. Face detection may also be used for cases where the subject is in the view of camera offering a full-frontal view. In the case of a video, the process of detecting the region having the foreground (and hence the background region) is performed over several initial frames. Alternatively, if the foreground is not a person, knowledge about the expected visual characteristics of the foreground may be used to detect the foreground. For example, if the foreground is a black dog, pixels associated with a region having black pixels that are associated with a texture corresponding to the fur of the dog may be assumed to be the foreground pixels, and the other pixels may be assumed to be the background. Having obtained the region having the person, the background model is built for the remaining pixels, just as in case I. For other types of foreground elements other detection methods may be used. If the foreground leaves the scene after the initial scenes, and if the background image is being modified in real time, optionally some of the methods of case I may be applied, at that time to get a better background model. If the foreground leaves the scene after the initial scenes, and if the background image is not being modified in real time, optionally some of the methods of case I may be applied, to those frames to get a better background model that may be used in all frames (including the initial frames).

In case III, in which the camera shakes or moves or for video or for a collection of two or more still images from somewhat different perspectives, stabilization of the incoming frames or still images is performed. Stabilization may be done by computing the transformation relating the current frame and previous frame, using optical flow techniques. Accordingly, every new frame is repositioned, or aligned with the previous frame to make the new frame stable and the stabilized data is obtained as input for the subsequent processing modules.

In step 208, the background model is updated. Whether the camera is fixed or moving and whether the initial frames show a foreground (in other words, in cases I-III), in practical systems, the assumption of fixed background conditions cannot be made, hence necessitating the requirement for an intelligent mechanism to constantly update the background model. For a series of still images, the backgrounds are matched. The system may use several cues to identify which pixels belong to a foreground region and which do not belong to a foreground region. The system may construct a motion mask (if the foreground is moving) to filter foreground from the background. The system may detect motion by comparing a grid-based proximity of an image of the foreground to previously identified grid of the foreground (where a grid is a block of pixels). The grid based proximity tracks the location of the foreground with respect to the grid. A scene-change test, may be performed in order to determine whether a true scene change occurred or just a change of lighting conditions occurred. The analysis may involve analyzing the hue, saturation, and value components of the pixels. Additionally, a no-activity test may be performed to find which pixels should undergo a background model update. Pixels that are classified as having no activity or an activity that is less than a particular threshold may be classified as no activity cells, and the background model for the no activity pixels is not updated. Constructing a motion mask and performing the above test makes the system extremely robust to lighting changes, to the Automatic Gain Control (AGC), to the Automatic White Balance (AWB) of the camera, and to the introduction and/or removal of inanimate objects to and/or from the scene.

In step 210 the foreground extraction is performed. The foreground may be extracted after identifying the background via techniques such as finding differences in the current image from the background image. The foreground may be separated by near frame differencing, which may include the subtraction of two consecutive or relatively close frames from one another. Some other techniques for separating the foreground may include intensity computations, texture computations, gradient computations, edge computations, and/or wavelet transform computations. In intensity computations, the intensity of different pixels of the image are computed to detect regions that have intensities that are expected to correspond to the foreground. In texture computation, the texture of the different portions of the image is computed to determine textures that are expected to correspond to the foreground. In gradient computation, the gradient computation computes the gradients of the images to determine gradients on the pixel intensities that are indicative of the location of the foreground.

Often, the background is not fixed and hence needs to be learnt continuously. For example, in an embodiment, the system adapts to the lighting conditions. The foreground may be extracted from individual frames via techniques, such as auto and adaptive thresholding, color, and/or shape segmentation. In an embodiment, the extraction may be performed with or without manual interaction.

The foreground extraction may have two phases. In phase I, using the fixed camera of cases I and II, the background model classifies each pixel in the current frame as belonging to either background, foreground (e.g., a person), or "unknown." The "unknown" pixels are later categorized as background or foreground, in phase II of the foreground extraction. Each pixel is assigned a threshold and is classified into either a background or foreground pixel depending on whether the pixel has a value that is above or below the threshold value of motion or a threshold value of another indicator of the whether the pixel is background or foreground. The determination of whether a pixel is a background pixel may be based on a differencing process, in which the pixel values of two frames are subtracted from one another and/or a range of colors or intensities. Regions having more motion are more likely to be associated with a person and regions having little motion are more likely to be associated with a background. Also, the determination of whether a pixel is part of the background or foreground may be based on any combination of one or more different features, such as luminance, chrominance, gradient, edge, and texture. If these different features are combined, the combination may be formed by taking a weighted sum in which an appropriate weighting factor for each are assigned to each feature. The weighting factors may be calculated based upon the scene's complexity. For example, for a "complex" scene (e.g., the subject and the background have similar colors), the gradient feature may be assigned significantly more weight than the threshold or intensity feature. There may be different thresholds for different portions of the foreground and/or background that are expected to have different characteristics. For a single still image, all of the pixels are classified as either background or foreground, and phase II is skipped.

In an embodiment, instead of having just two thresholds (one for the background and one for a foreground), for one or more features (e.g., the luminance, chrominance, etc.), there may be several thresholds for a pixel. For example, there may be two thresholds that bracket a range of intensities within which the pixel is considered to be a background pixel. There may be a set of one or more ranges within which the pixel may be considered to be a background pixel, a set of one or more ranges within which the pixel is considered to be a foreground pixel, and/or there may be a set of one or more ranges within which the determination of whether the pixel is a foreground or background pixel is delayed and/or made based on other considerations. Each pixel may have a different set of thresholds and/or different sets of ranges of intensities within which the pixel is deemed to be background, foreground, or in need of further processing. The variable thresholds and/or ranges may come from the model learnt for each pixel. These thresholds can also be continuously changed based on scene changes.

In case III in which the camera is mobile, a series of still images or frames of a video, a foreground tracking technique is employed to continuously keep track of the profile of the person, despite the constantly changing background. Foreground tracking may be done by a combination of techniques, such as color tracking and optical flow.

The foreground extraction of phase II is the same whether the camera is fixed or moving or whether the initial frames have a foreground or do not have a foreground. In each of cases I-III, the "unknown" pixels from the foreground extraction of phase I are classified into background or foreground using the temporal knowledge and/or historical knowledge. In other words, in phase I the pixel is classified based on information in the current scene. If the information in the current scene is inadequate for making a reasonably conclusive determination of the type of pixel, then historical data is used in addition to, and/or instead of, the data in the current scene. For example, if an "unknown" pixel falls into a region where there has been consistent presence of the foreground for the past few seconds, the pixel is classified as belonging to foreground. Otherwise, the pixel is classified as a background pixel.

Additionally, in case III, for the case of a mobile camera, the result of tracking from phase I is refined using a particle filter based contour tracking, which is a sequential Monte Carlo method for tracking the object boundaries. The particle filter based tracking also handles occlusions well.

The foreground may be extracted from individual frames via techniques, such as Auto and adaptive thresholding, color or shape segmentation, texture calculation, gradient calculation, edge computation, and/or wavelet transform computation. In an embodiment, the extraction may be performed with or without manual interaction.

In step 212, the profile is enhanced. For fixed and moving cameras whether or not the initial frames have a foreground, cases I and II, the output of the previous step is a map of pixels, which are classified as either being part of the foreground or the background. However, there is no guarantee that the pixels classified as foreground pixels form a shape that resembles the object that is supposed to be depicted by the foreground. For example, if the foreground objects are people, there is no guarantee that the collection of foreground pixels forms a shape that resembles a person or has a human shape. In fact, a problem that plagues most of the available systems is that the foreground pixels may not resemble the object that the foreground is supposed to resemble. To address this problem a profile enhancing module is included. A search may be conducted for features that do not belong in the type of foreground being modeled. For example, a search may be conducted for odd discontinuities, such as holes inside of a body of a person and high curvature changes along the foreground's bounding profile. The profile may be smoothened and gaps may be filled at high curvature corner points. Also, profile pixels lying in close vicinity of the edge pixels (e.g., pixels representing the Canny edge) in the image are snapped (i.e., force to overlap) to coincide with the true edge pixels. The smoothing, the filling in of the gaps, and the snapping operation creates a very accurate profile, because the edge pixels have a very accurate localization property and can therefore be located accurately. If the foreground includes other types of objects other than people, such as a box or a pointy star, the profile handler may include profiles for those shapes. Also, the types of discontinuities that are filtered out may be altered somewhat depending on the types of foreground elements that are expected to be part of the foreground.

In optional step 214, shadows are identified. Whether the camera is fixed or moving and whether the initial frames show a foreground (in other words, in cases I-III), an optional add-on to the person extraction may include a shadow suppression module. Shadow pixels are identified by analyzing the data in the Hue, Saturation, Value (HSV) color space (value is often referred to as brightness). A shadow pixel differs from the background primarily in its luminance component (which is the value of brightness) while still having the same value for the other two components. Shadows are indicative of the presence of a person, and may be used to facilitate identifying a person.

In step 216, post processing is performed. Whether the camera is fixed or moving and whether the initial frames show a foreground (in other words, in cases I-III), the post-processor module may allow for flexibility in manipulating the foreground and background pixels in any desired way. Some of the available features are blending, changing the brightness and/or contrast of the background and/or the foreground, altering the color of the background/foreground or placing the foreground on a different background. Placing of the foreground on a different background may include adding shadows to the background that are caused by the foreground.

To gain more realism, at the boundary of the person and the scene, called the "seam", additional processing is done. The processing at the seam is similar to pixel merging or blending methods. First a seam thickness or blending thickness is determined or defined by the user. Alternatively, the seam thickness is determined automatically according to the likelihood that a pixel near an edge is part of the edge and/or background or according to the type of background and/or foreground element. In an embodiment, the seam can be from 1-3 pixels to 4-10 pixels wide. The width of seam may represent the number of layers of profiles, where each profile slowly blends and/or fades into the background. The pixels closer to the profile will carry more of the foreground pixel values (e.g., RGB or YUV). The percentage blending may be given by the formula:

New pixel=(% foreground pixel weight)*(foreground pixel)+(% background pixel weight)*background pixel For a 1-layer blending the percentage of person pixel weight and background pixel weight may be 50-50%. For a two layer blending or smoothening, the percentage of person pixel weight and background pixel weight may be 67-33% for the first layer and may be 33-67% for the second layer. In an embodiment the percentage of background plus the percentage of foreground equals 100% and the percentage of background varies linearly as the pixel location gets closer to one side of the seam (e.g., nearer to the background) or the other side of the seam (e.g., nearer to the person). In another embodiment, the variation is nonlinear.

In an embodiment, each of the steps of method 200 is a distinct step. In another embodiment, although depicted as distinct steps in FIG. 2, step 202-216 may not be distinct steps. In other embodiments, method 200 may not have all of the above steps and/or may have other steps in addition to or instead of those listed above. The steps of method 200 may be performed in another order. Subsets of the steps listed above as part of method 200 may be used to form their own method.

Figure 3:
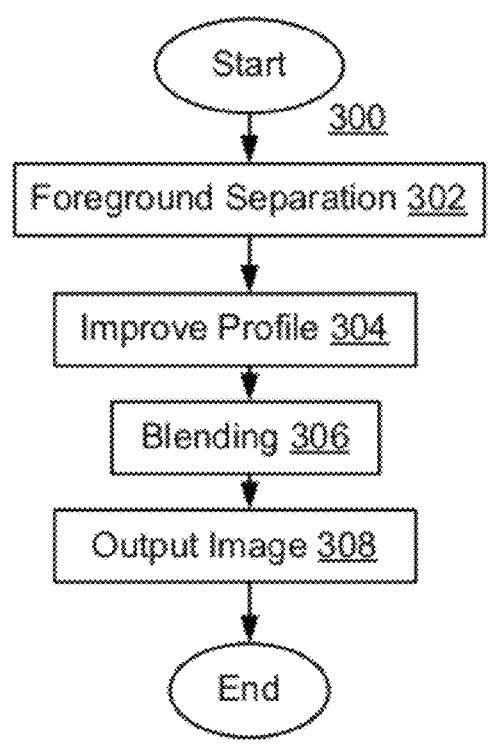
FIG. 3 shows a flowchart of another embodiment of a method for manipulating images.

FIG. 3 shows a flowchart of another embodiment of a method 300 for manipulating images. Method 300 is an embodiment of method 200. In step 302 the background and foreground are separated. In step 304, the profile of the foreground is enhanced by applying smoothing techniques, for example.

As part of step 304, the background of the image or video is switched for another background. For example, new scene is created by inserting the person in the new background or video. If the new scene is a fixed image, then the person extracted is inserted first. Then the following blending or adjustment may be performed. The extracting of the person and the insertion of the new background is repeated at fast intervals to catch up and/or keep pace with a video speed, which may be 7-30 frames/sec.

The new scene is created by inserting the foreground in the new background scene or video. If the new scene is a fixed image, then the foreground extracted is inserted first. Then the following blending or adjustment is done as an option. The extracting of the person and the insertion of the new background is repeated at fast intervals to catch up and/or keep pace with a video speed of typically 7-30 frames/sec. In case a video is selected as a scene or background, then the following steps are performed. For each current image from the video, a current image of the video is extracted.

In step 306, the foreground is fused with another background or a variety of different elements are blended together, which may include manipulating the elements being combined. Then the two images are merged and operated upon. Then the results are posted to accomplish the Video-On-Video effect. For each current image from the video, a current image of the scene video is extracted. Then the two images are merged and operated upon. Blending and smoothening is also discussed in conjunction with step 216 of FIG. 2. In step 308, the results of the image manipulations are posted, which for example may accomplish a Video-On-Video effect. For example, the fused image is outputted, which may include display the fused image on a display, storing the fused image in an image file, and/or printing the image.

In an embodiment, each of the steps of method 300 is a distinct step. In another embodiment, although depicted as distinct steps in FIG. 3, step 302-308 may not be distinct steps. In other embodiments, method 300 may not have all of the above steps and/or may have other steps in addition to or instead of those listed above. The steps of method 300 may be performed in another order. Subsets of the steps listed above as part of method 300 may be used to form their own method.

Figure 4:
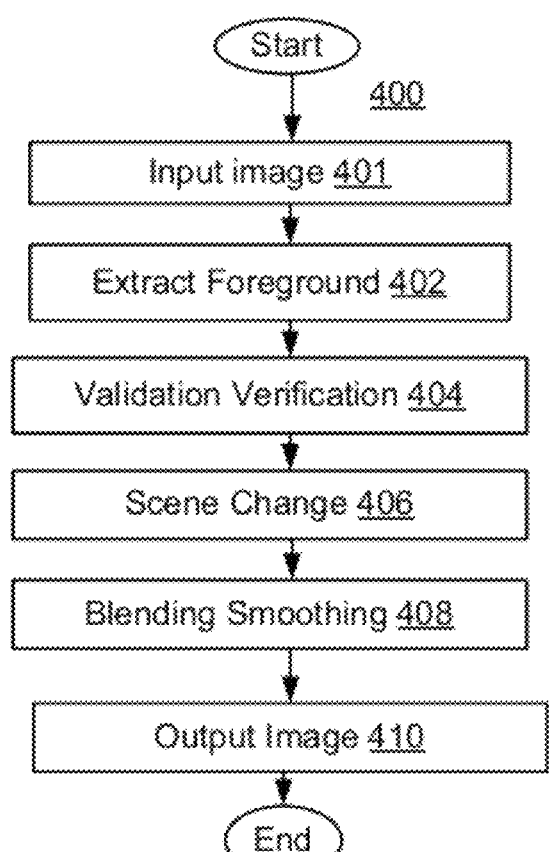
FIG. 4 shows a flowchart of another embodiment of a method for manipulating images.

FIG. 4 shows a flowchart of another embodiment a method 400 for manipulating images. Method 400 is an embodiment of method 200. In step 401, an image is taken or is input to the system. In step 402, the foreground is extracted from the background, and the background and foreground are separated. In step 404, the foreground is verified. The verification may involve checking for certain types of defects that are inconsistent with the type of image being produced, and the verification process may also include enhancing the image. In an embodiment in which the foreground is one or more people, the people may be in any pose, such as standing, walking, running, lying, or partially hiding. The system may evaluate the profiles, blobs, and/or regions first. The system may perform a validation to extract only one foreground object or to extract multiple foreground objects. As part of the validation, the system may eliminate noise, very small objects (that are smaller than any objects that are expected to be in the image), and/or other invalid signals. Noise or small objects may be identified by the size of the object, the variation of the intensity of the pixels and/or by the history of the information tracking the foreground (e.g., by the history of the foreground tracking information). Then all the profiles or regions may be sorted by size, variation, and the probability that the profile is part of a foreground object. In embodiments in which the foreground objects are people, only the largest blobs with higher probability of being part of a person are accepted as part of a person.

In step 406, the background is switched for another background. In step 408, the foreground is fused with another background or a variety of different elements are blended together, which may include manipulating the elements being combined. In step 410, the fused image is outputted, which may include displaying the fused image on a display, storing the fused image in an image file, and/or printing the image.

In an embodiment, each of the steps of method 400 is a distinct step. In another embodiment, although depicted as distinct steps in FIG. 4, step 401-410 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

Figure 5:
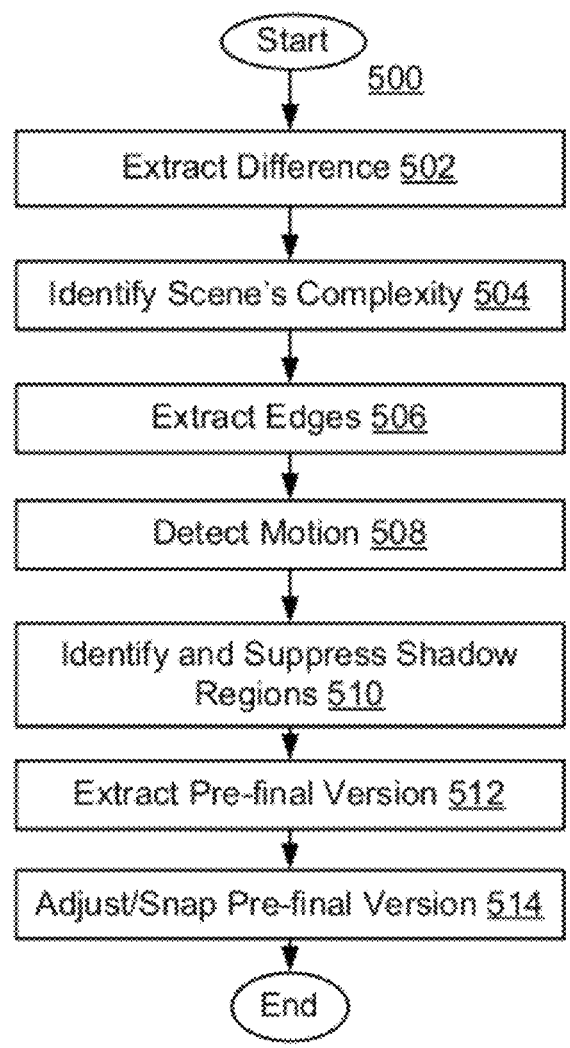
FIG. 5 shows a flowchart of an embodiment of a method for extracting a foreground.

FIG. 5 shows an embodiment of a method 500 of extracting a foreground. When the foreground element (e.g., the user, another person, or another foreground element) enters the scene, the system may perform the extraction of the user in the following way. The system may use one or multiple details of information to determine the exact profile of the person. The algorithm may include the following steps. In step 502, the difference between the current video frame from the background model is subtracted. This may or may not be a simple subtraction. A pixel may be determined to be part of the background or foreground based on whether the pixel values fall into certain color ranges and/or the various color pixels change in intensity according to certain cycles or patterns. The background may be modeled by monitoring the range of values and the typical values for each pixel when no person is present at that pixel. Similarly, the ranges of values of other parameters are monitored when no person is present. The other parameters may include the luminance, the chrominance, the gradient, the texture, the edges, and the motion. Based on the monitoring, values are stored and/or are periodically updated that characterize the ranges and typical values that were monitored. The model may be updated over time to adapt to changes in the background.

In step 504, the current background's complexity is identified, and accordingly the appropriate image processing techniques are triggered, and the parameters and thresholds are adjusted based on the current background's complexity. The complexity of a scene may be measured and computed based on how many edges are currently present in the scene, how much clutter (e.g., how many objects and/or how many different colors) are in the scene, and/or how close the colors of the background and foreground objects are to one another. The complexity may also depend on the number of background and foreground objects that are close in color. In an embodiment, the user may have the option to specify whether the scene is complex or not. For example, if a person in the image is wearing a white shirt, and the background is also white, the user may want to set the complexity to a high level, whether or not the system automatically sets the scene's complexity.

In step 506, all edges and gradient information are extracted from the current image. Edges may be identified and/or defined according to any of the edge detection methods (such as Canny, Sobel etc and other technique can be used)). Appendix A discusses the Canny edge technique.

In optional step 508, motion clues are detected. The amount of motion may be estimated by subtracting the pixel values of two consecutive frames or two frames that are within a few frames of one another, which may be referred to as near frame differencing. Alternatively or additionally, motion may be measured by computing the optical flow. There are several variations or types of Optical Flow from which the motion may be estimated. As an example of just one optical flow technique, optical flow may be computed based on how the intensity changes with time. If the intensity of the image is denoted by I(x,y,t), the change in intensity with time is given by the total derivative of the intensity with respect to time.

If the image intensity of each visible scene point is unchanging over time, then which implies $$I_x u + I_y v + I_t = 0,$$

where the partial derivatives of I are denoted by the subscripts x, y, and t, which denote the partial derivative along a first direction (e.g., the horizontal direction), the partial derivative along a second direction (e.g., the vertical direction) that is perpendicular to the first direction, and the partial derivative with respect to time. The variables u and v are the x and y components of the optical flow vector.

For cases when it is not practical or not possible to use an empty scene as a starting point, only motion can be used to identify which portions of the scene might belong to a person, because the portions of the scene that have motion may have a higher probability of being a person. Additionally, the motion may indicate how to update the background model. For example, parts of the scene that do not have movement are more likely to be part of the background, and the model associated with each pixel may be updated over time.

In step 510, shadow regions are identified and suppressed. Step 510 may be performed by processing the scene in Hue, Saturation, Value (HSV or HSL) or LAB or CIELAB color spaces (instead of, or in addition to, processing the image in Red, Green, Blue color space and/or another color space). For shadow pixels, only the Value changes, while for non-shadow pixels, although the Value may change, the Hue and Saturation may also change. Other texture based methods may also be used for suppressing shadows. When the scene is empty from people and the background is being identified, shadow regions are not as likely to be present. Shadows tend to come into a picture when a person enters the scene. The location and shape of a shadow may (e.g., in conjunction with other information such as the motion) indicate the location of the foreground (e.g., person or of people).

In step 512 a pre-final version (which is an initial determination) of the regions representing the foreground are extracted. Next in step 514, the pre-final profile is adjusted/snapped to the closest and correct edges of the foreground to obtain the final profile. In a set of given foreground and/or background scenes, there may be multiple disconnected blobs or regions. Each profile may be a person or other element of the foreground. To snap the pre-final profile refers to the process of forcing the estimated foreground pixel near the edge pixel, to lie exactly on to the edge pixel. Snapping achieves a higher localization accuracy, which corrects small errors in the previous stages of identifying the image of the foreground. The localization accuracy is the accuracy of pixel intensities within a small region of pixels.

In an embodiment, each of the steps of method 500 is a distinct step. In another embodiment, although depicted as distinct steps in FIG. 5, step 502-514 may not be distinct steps. In other embodiments, method 500 may not have all of the above steps and/or may have other steps in addition to or instead of those listed above. The steps of method 500 may be performed in another order. Subsets of the steps listed above as part of method 500 may be used to form their own method.

Figure 6:
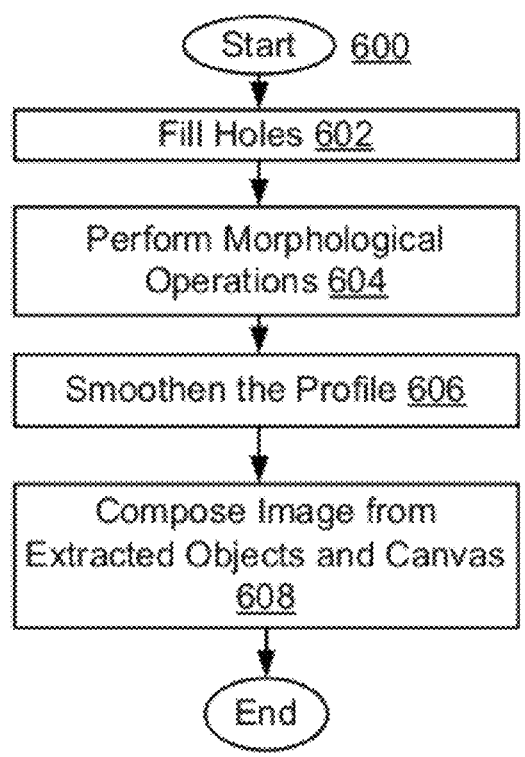
FIG. 6 shows a flowchart of an example of a method for improving the profile of the foreground.

FIG. 6 shows a flow chart of an example of a method 600 for improving the profile of the foreground. In method 600, after the foreground has been initially extracted, the quality of extracted outer profile may be improved by performing the following steps. In step 602, holes in the foreground element may be automatically filled within all extracted foreground objects, or only those objects that are expected not to include any holes are filled in. In step 604, morphological operations, such as eroding and dilating are performed. Morphological operations may include transformations that involve the interaction between an image (or a region of interest) and a structuring element. More intuitively, dilation expands an image object with respect to other objects in the background and/or foreground of the image and erosion shrinks an image object with respect to other objects in the background and/or foreground of the image. In step 606, the profile of the foreground is smoothened, which, for example, may be performed by convolving pixel values with a Gaussian function or another process in which a pixel value is replaced with an average, such as a weighted average, of the current pixel value with neighboring pixel values. In step 608, once the foreground objects have been extracted from one or more sources, they are placed into a new canvas to produce an output image. The canvas frame can itself come from any of the sources that the foreground came from (e.g., still images, video clips, and/or live images).

In an embodiment, each of the steps of method 600 is a distinct step. In another embodiment, although depicted as distinct steps in FIG. 6, step 602-608 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Figure 7:
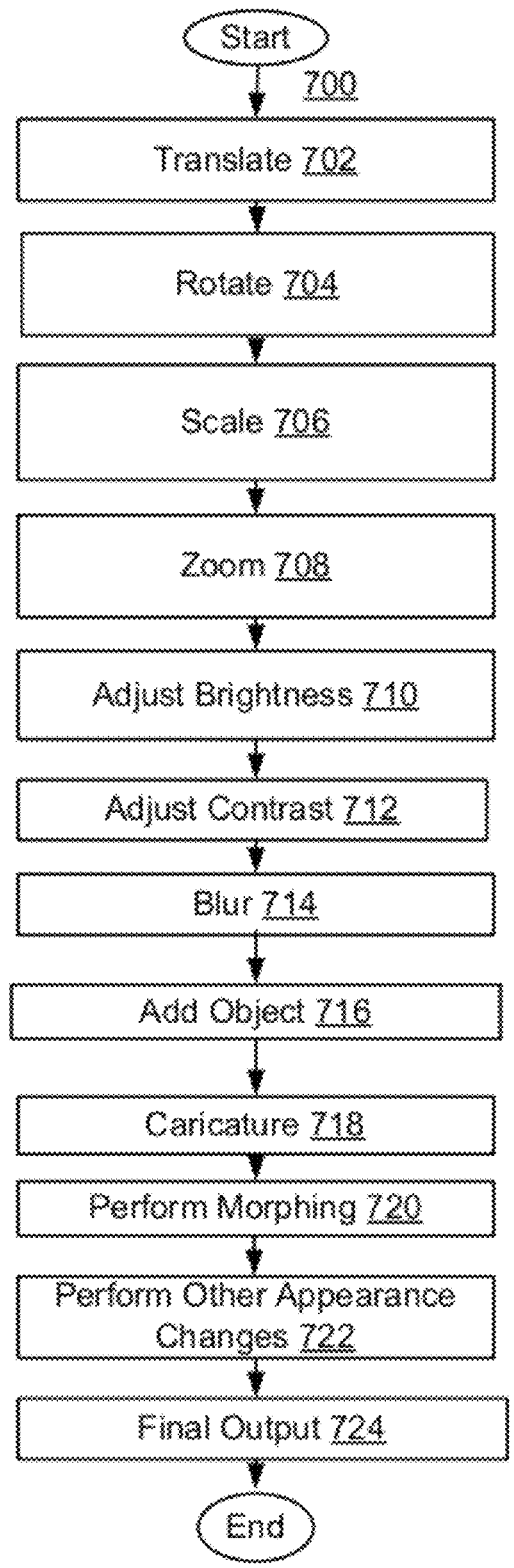
FIG. 7 shows a flowchart of an embodiment of a method for fusing and blending elements.

FIG. 7 shows a flowchart of an embodiment of a method 700 of fusing and blending elements. During method 700, the foreground may be individually transformed before they are placed on the canvas with one or more of the following transformations. In step 702, a translation of the foreground may be performed: The translation of step 702 may include a translation in any direction, any combination of translations of any two orthogonal directions and/or any combination of translations in any combination of directions. The amount of translation can be a fixed value or a function of time. The virtual effect of an object moving across the screen may be created by performing a translation.

In step 704, a rotation is performed. The rotation may be a fixed or specified amount of rotation, and/or the rotational amount may change with time. Rotations may create the virtual effect of a rotating object. In step 706 a scaling may be performed: During scaling, objects may be scaled up and down with a scaling factor. For example, an object of size a X b pixels may be enlarged to twice the object's original size of 2a X 2b pixels on the canvas or the object may be shrunk to half the object's original size of X pixels on the canvas. The scaling factor can change with time to create the virtual effect of an enlarging or shrinking object. In step 708, zooming is performed. Zooming is similar to scaling. However, during zooming only a portion of the image is displayed, and the portion displayed may be scaled to fit the full screen. For example, an object of 100×100 pixels is being scaled down to 50×50 pixels on the canvas. Now, it is possible to start zooming in on the object so that ultimately only 50×50 pixels of the object are placed on the canvas with no scaling.

In step 710, the brightness and/or illumination may be adjusted. Objects are made lighter or darker to suit the canvas illumination better. Brightness may be computed using a Hue, Saturation, Value color space, and the Value is a measure of the brightness. Brightness can be calculated from various elements and each object's brightness can be automatically or manually adjusted to blend that object into the rest of the scene.

In step 712, the contrast is adjusted. The contrast can be calculated for various elements and each object's contrast can be automatically or manually adjusted to blend the object's contrast into the entire scene. The difference between the maximum brightness value and the minimum brightness value is one measure of the contrast, which may be used while blending the contrast. The contrast may be improved by stretching the histogram of the region of interest. In other words, the histogram of all the pixel values is constructed. Optionally, isolated pixels that are brighter than any other pixel or dimmer than other pixel may be excluded from the histogram. Then the pixel values are scaled such that the dimmest edge of the histogram has the dimmest pixel possible value and the brightest edge of the histogram corresponds to the bright possible pixel value. The contrast can be calculated from various elements, and each of the object's contrast can be automatically or manually adjusted to even out for the entire scene.

In step 714, the elements of the image are blurred or sharpened. This is similar to adjusting focus and making objects crisper. Sharpness may be improved by applying an unsharp mask or by sharpening portions of the image. The objects can be blurred selectively by applying a smoothening process to give a preferential "sharpness" illusion to the foreground (e.g., the user, another person, or another object).

In step 716, one or more objects may be added on, behind, or besides the foreground. Once the location, position, and/or orientation of an object is obtained, the object may be added to the scene. For example, if the foreground is a person, images of clothes, eye glasses, hats, jewelry, makeup, different hair styles etc. may be added to the image of a person. Alternatively a flower pot or car or house can be placed beside or behind the person. After obtaining the position, orientation, scale, zoom level, and/or a predefined object size, shape, and/or limits, the foreground and the virtual object added may be matched, adjusted, superimposed, and/or blended.

In step 718, caricatures of objects may be located within the scene in place of the actual object. Faces of people can be replaced by equivalent caricature faces or avatars. A portion of one person's face may be distorted to form a new face (e.g., the person's nose may be elongated, eyes may be enlarged and/or the aspect ratio of the ear may be changed). Avatars are representations of people by an icon, image, or template and not the real person, which may be used for replacing people or other objects in a scene and/or adding objects to a scene.

In step 720, morphing is performed. Different portions of different foregrounds may be combined. If the foreground includes people's faces, different faces may be combined to form a new face. In step 722, appearances are changed. Several appearance-change transformations can be performed, such as, a face change (in which faces of people are replaced by other faces), a costume change (in which the costume of people are be replaced with a different costume).

Some of these objects or elements may come from stored files. For example, a house or car or a friend's object can be stored in a file. The file may be read and the object may be blended from the pre-stored image and NOT from the live stream. Hence elements may come from both Live and Non-Live stored media. Once the foreground objects have been placed on the canvas, certain operations are performed to improve the look and feel of the overall scene. These may include transformations, such as blending and smoothening at the seams.

In step 724, the final output may be produced. The final output of the system may be displayed on a monitor or projected on a screen, saved on the hard disk, streamed out to another computer, sent to another output device, seen by another person over IP phone, and/or streamed over the Internet or Intranet.

In an embodiment, each of the steps of method 700 is a distinct step. In another embodiment, although depicted as distinct steps in FIG. 7, step 702-724 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

Figure 8:
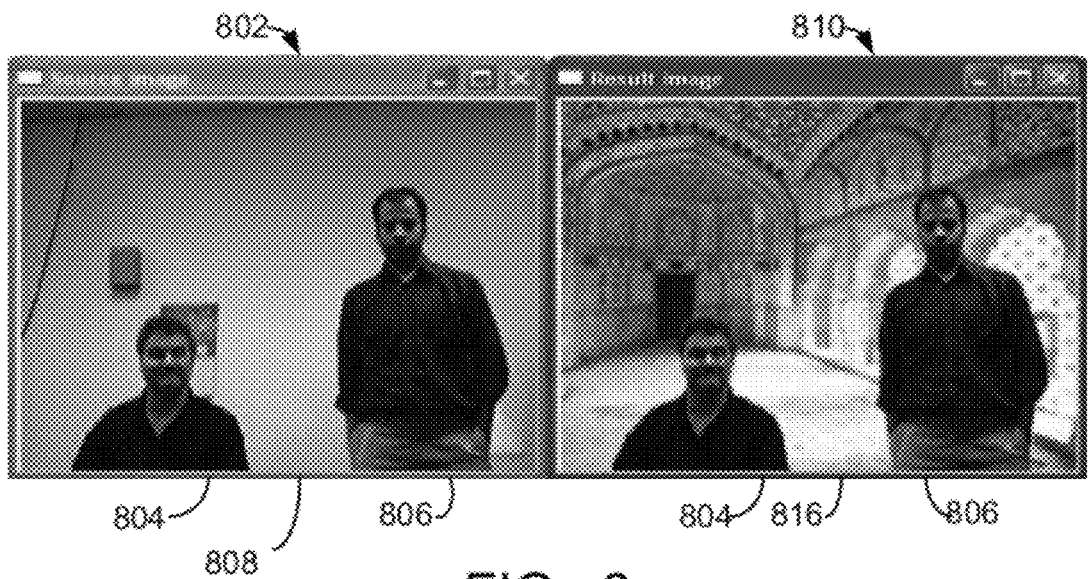
FIG. 8 shows an example of switching the background image.

FIG. 8 shows example 800 of switching the background image. Example 800 includes source image 802, first foreground image 804, second foreground image 806, original background 808, result image 810, and replacement background 816.

Source image 802 is an original unaltered image. First foreground image 804 and second foreground image 806 are the foreground of source image 802, and in this example are a first and second person. Background 808 is the original unaltered background of source image 802. Result image 810 is the result of placing first foreground image 804 and second foreground image 806 of source image 802 on a different background. Background 816 is the new background that replaces background 808. In other embodiments, example 800 may not have all of the elements listed and/or may have other elements instead of or in addition to those listed.

Figure 9:
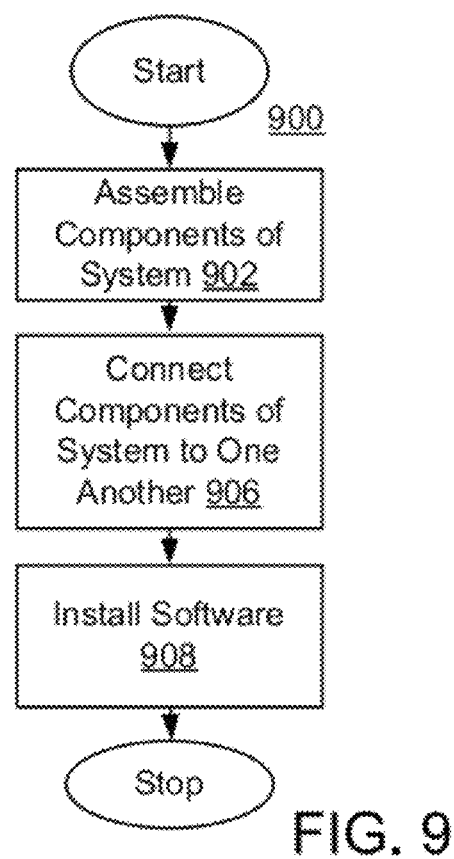
FIG. 9 is a flowchart of an example of a method for making the system of FIGS. 1A and 1B.

FIG. 9 is a flowchart of an example of a method 900 of making system 100. In step 902 the components of system 100 are assembled, which may include assembling camera 102, original images 104, replacement objects 106, output device 108, input device 110, processing system 112, output system 122, input system 124, memory system 126, processor system 128, communications system 132, and/or input/output device 134. In step 906 the components of the system are communicatively connected to one another. Step 906 may include connecting camera 102, original images 104, replacement objects 106, output device 108, input device 110 to processing system 112. Additionally or alternatively, step 906 may include communicatively connecting output system 122, input system 124, memory system 126, processor system 128, and/or input/output device 134 to communications system 132, such that output system 122, input system 124, memory system 126, processor system 128, input/output device 134, and/or communications system 132 can communicate with one another. In step 908, the software for running system 100 is installed, which may include installing hardware controller 148, image processing instructions 150, and other data and instructions 152 (which includes instructions for carrying out the methods of FIGS. 2-7). Step 908 may also include setting aside for memory in memory system 126 for original images 104, replacement objects 106, input images 142, and/or output images 146.

In an embodiment, each of the steps of method 900 is a distinct step. In another embodiment, although depicted as distinct steps in FIG. 9, step 902-908 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

A person or object screening system (POSS) may be created by integrating multiple imaging sensors, such as Millimeter-Wave (MMW) sensors, Infra-Red (IR) sensors, thermal sensors, video cameras, Terahertz (THZ) sensors, microphones, and/or X-Ray (XR) systems. The system may use one or more of these sensors to determine whether to identify an entity as a security threat. The system may include a data acquisition and management sub-system, a data preprocessing system, an automatic object detection and classification system, a display unit, a multi-sensor data fusion module, an events and event management sub-system, a system for taking measurements, a system for analyzing the data, a system for network streaming (e.g., using server-client architecture), a tamper detection module, a remote monitoring and client viewing module, a client operation system, a database of events, a search engine, Application Program Interface (API)/Software development Kit (SDK) for external application integration, user level management and privacy and security protection, reports and logs, integrated web server for status and event review, the capability of joining multiple cameras as panoramas, and/or the capability of joining multiple cameras/sensors into 1 unified interface and more. The system may be incorporated within a camera or the system may be located and operated outside of the camera, similar to a networked Internet Protocol (IP) device.

The person or object screening system may provide full surveillance, analysis, detection, and user management modules. The person or object screening system can be used to detect people, objects on people, or weapons on the human body. The POSS system may be used for security/surveillance for detecting weapons and explosive materials on a human body. The detection happens may occur in real time in less than a second. In an embodiment, the POSS does not require the person to remain still. That is, the detection may occur while a person is walking. The POSS (e.g., the screening of entities for security risks and the results of the analysis) of whether an entity is a security threat may be remotely monitored and controlled. Reports relating to the screening process and entities screened may be generated that can be viewed and searched later. In an embodiment the full screening process and analysis does not require any human inputs/interaction after the initial setup. The full screening and analysis may provide the ability to configure the detection, the display, and report settings in order to meet the specific requirements of an environment. The problematic or suspicious part of a video may be recorded with a network video recorder application, which may be later searched and viewed. In en embodiment, the POSS can save the events, which can later be searched. The POSS may display the location of potential threats on the people who enter the POSS's field of view.

System Architecture

Figure 10A:
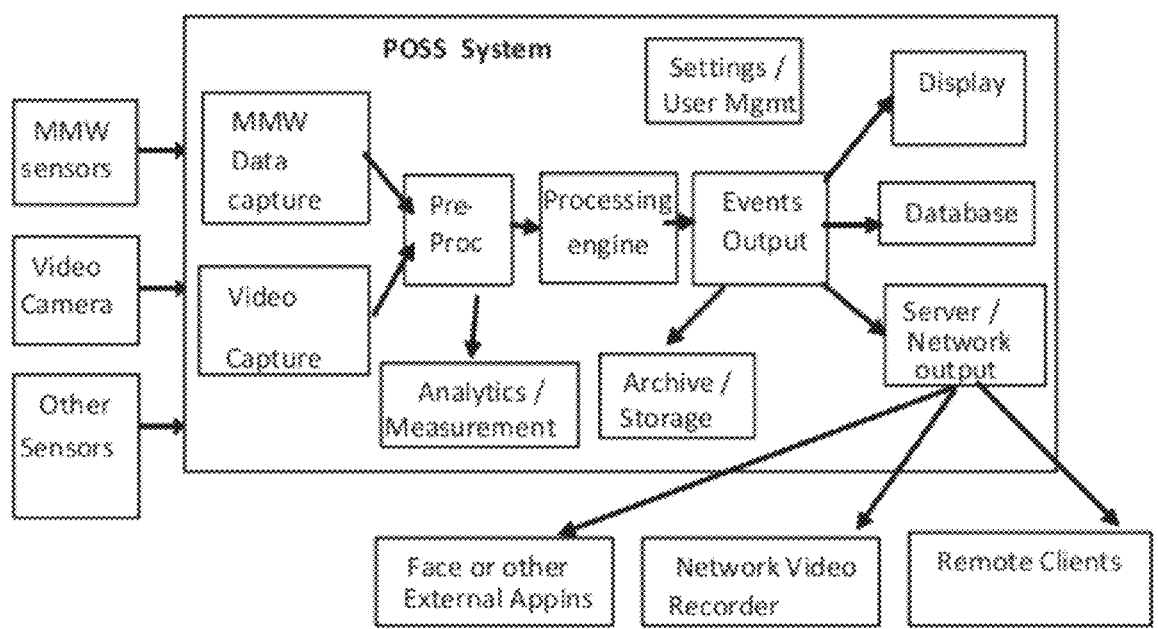
FIG. 10A shows a block diagram of an example of the architecture of the POSS.

FIG. 10A shows the architecture of the POSS. The POSS may have a flexible and powerful architecture. In an embodiment, the system may accept input from any one or more of a Millimeter Wave (MMW) sensor, an Infrared (IR) sensor, a video camera (which may be capable of detecting a full color spectrum), a Tera Hertz (TH) sensor, and/or an X-Ray (XR). Each of these sensors provides a different type of data. The sensors data may be received as input via analog or (analog lines), digital lines such as a Universal Serial Bus (USB), Firewire 1394 interface, or a serial interface. Additionally or alternatively the sensor data may be received via Ethernet (e.g., an IP network and/or Local Area Network (LAN)), and/or a Wireless interface (e.g., BlueTooth, Wifi, Zigbee, Radio Frequency (RF)).

In an embodiment, the POSS interacts with sensors by Analog, Digital, and/or LAN/IP network (TCP/IP protocol). The sensors send the data to processor system portion of the POSS. The POSS capture the data sent and performs pre-processing before starting the actual detection.

The processor system can send various signals to the sensor, such as, signals to re-calibrate the sensors, signals to indicate that various events and/or objects were detected, signals to indicate that a person is present or is not present in a scene, and/or signals to indicate a data frame rate control signal. The indication of an event being detected can be used for activating fire alarms or any other mechanical or electrical actions. The processor unit may request data with a required frame rate.

The application also receives other data from the sensor along with the sensor data, such as, the current frame rate, the current size of the frame, the current sensor data (e.g., the current temperature), the calibration information, and/or the temperature drift since the last calibration.

Figure 10B:
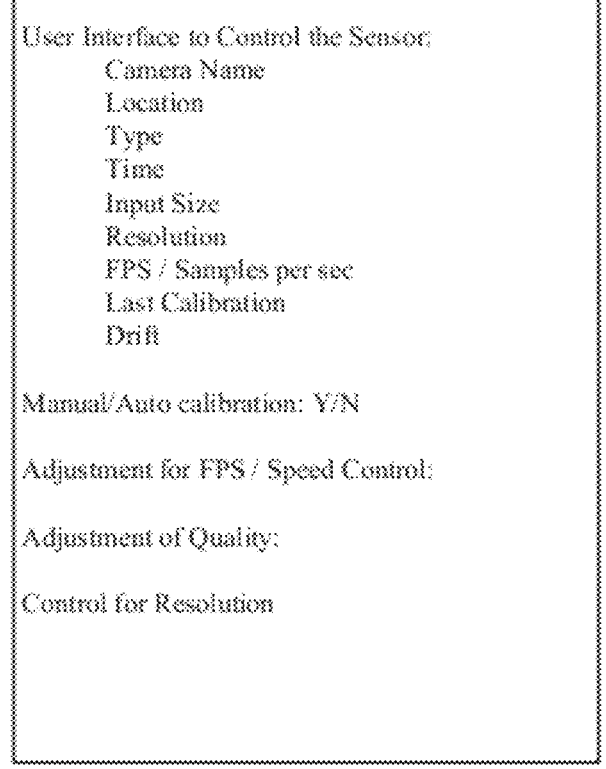
FIG. 10B shows a block diagram of an example of a user interface for the POSS.

FIG. 10B shows a block diagram of an example of a user interface for the POSS. The POSS can provide a good user interface for display and control of sensor data. The user interface may be used to control the sensors (e.g., the cameras and/or other sensors). The user interface may display the camera or sensor name, the location of the camera or sensor, and/or the type of camera or sensor. The user may be provided with fields to enter the name, location, and/or type of camera upon setting up and configuring the camera or sensor. The user may be provided with fields to enter the name, location, and/or type of camera or sensor as a means for specifying the camera or sensor whose output data the user would like to view. The user may also be able to specify the time for setting the clock of the POSS, labeling data recorded by the POSS, and/or for searching for and viewing data already recorded by the POSS. The user interface may also allow the user to specify the size of the data input, the resolution at which the data is viewed and/or taken, and/or the sample rate (e.g., the number of frames during a specified time period or the number of frames per second) at which the data is viewed and/or taken. The user interface may display the date and/or time of the last calibration and/or the amount of drift or change between calibrations. The user interface may have an input for whether to perform a manual calibration and/or whether calibrations should be performed automatically. User interface may allow the user to specify the quality desired for the data input and/or the quality desired for the output data.

Video Interface

The POSS may have a "Video Capture" module, which may be capable of capturing video data from different types of cameras. The captured video may be converted to raw data in any of a number of color space models, such as Red, Green, Blue (RGB), Yellow Ultraviolet (YUV), and/or, another color space format for processing. In an embodiment, processing always happens on raw color data (e.g., RGB) and is independent of the type of video captured. The video capture module may support digital cameras, may support analog cameras, may support many different Internet Protocol (IP) cameras, such as Axis, Vicon, JVC, for example. The POSS may also be integrated within a custom video input module, which may have a generic video capture interface.

Display

The system may have a user-friendly display that facilitates viewing events. Each type of event may have its own color code, which makes it easier for the viewer and interpret the event than were no color coding provided. The user may be provided with a list of events and the option to select which event to view. When viewing the event there may be a number of details and different types of data that the user may select to view. In an embodiment, each event may include video and an MMW snapshot of the event.

The video captured from the camera may be shown on the screen of a monitor with indications of the location of the areas that were identified as having a higher likelihood of a threat than is normal and/or the location of the areas that were identified as being expected to include a threat. Additionally or alternatively MMW data from the sensors is converted into a displayable format and the areas of threat are displayed on the display of a monitor.

Sensor Tamper Detection

Sensor tamper detection can be made part of the system. Tamper detection may detect whether the sensors are working properly, have been purposely tampered with and/or have been accidentally tampered with. In an embodiment, the sensor status is viewable on the screen of a monitor. The POSS may detect the sensor tampering in a number of ways, such as by detecting that a sensor is not providing a signal (or is disconnected), that no people are present, and/or other irregularities in the sensor data and/or in a scene and is being monitored. The status of the sensor (e.g., connected, no irregularities detected in the data) may be displayed on the screen of the monitor. In an embodiment, the tamper detection may any of a number of features, such as detect that availability or presence of a sensor signal, detecting size of the input data, the sample rate (e.g., the Frames Per Second (FPS)), resolution of the signal, and/or quality of the signal. If the signal is not present, the resolution is different than expected, the sample rate is different than expected, the quality of the signal is different than expected, it may be an indication of tampering with the sensor, and the POSS may indicate that a sensor may have been tampered with or is not functioning as configured and/or as expected. The tamper detection may include comparing the data (e.g., the image) with the background data or the signal associated with the background of a scene. If the background of the data (e.g., of the image) is very different from the typical scene signal and/or the expected patterns are different possible tamper may be indicated. Additionally, or alternatively, the noise level in the data and/or the range of the data signal may be compared to the expected noise level and/or the expected range of the signal, and if the measured noise and/or measured signal range is significantly different than the expected noise level or expected range of signal an indication may be given that a tamper or other problem may exist.

Administration or User Controls and Level

The POSS may have one or more levels of controls. In an embodiment, the POSS has two or three levels of control. The first level of control may be the user controls. In an embodiment, the user can only monitor and/or view the server and events, but cannot do any changes in the to the detection, display, and/or network settings.

The second level of control may be the controls that an administrator is allowed to manipulate. In an embodiment, the administrator has limited access to the detection settings and full access to display and network settings.

A third level of controls may be the master controls. In an embodiment, the master controls have full control over all of the POSS settings. Each of the levels of access may controlled by rules, policies, and/or privileges associated with the login user name and/or passwords.

Application Licensing

Access of the POSS system may require license keys and/or passwords. The POSS may store a camera serial number, identification (ID), a Universal Serial Bus (USB) dongle, processor ID, sensor ID, and/or MAC address of licensed users. The POSS may determine whether a user is licensed and/or allowed to access the POSS be requiring the user or a user device to submit a camera serial number, identification (ID), a Universal Serial Bus (USB) dongle, processor ID, sensor ID, and/or MAC address. There may be permanent and trial version licenses for the application, and determine whether there is a match between the stored and submitted camera serial number, identification (ID), a Universal Serial Bus (USB) dongle, processor ID, sensor ID, and/or MAC address.

Pre-Processing Data

The preprocessing module prepares and pre-processes the data before analyzing the data for tampering and/or whether there is a security threat. Pre-processing can be useful for display, operator analysis, engine auto detection, data review and/or data storage. The operator analysis is the analysis manually performed and/or reported by the operator. The raw sensor data is modified and made better before the display and detection operations. Processing can include any or all of a number of features, such as contrast enhancement, resolution enhancement, size enhancement, noise reduction, object accentuation, region accentuation, brightness, increasing the number of data frame (e.g., the number image frames) presented within a given time period, de-interlacing, and/or enhancing the dithering. Contrast enhancement may improve (or "stretch") the contrast of the image by making dark areas darker and light areas lighter. Resolution and/or size enhancement may extrapolate between data points to increase the total number of data pointes, thereby increasing the resolution of output of the sensor (e.g., the camera). Noise reduction may identify data that is expected to be noise (based on its frequency, range, and/or other characteristics) and remove the data that is expected to be noise. Data points that are expected to be noise may be replaced with extrapolated data values. Object/Region accentuation may highlight and/or otherwise accentuate some of the regions, objects, and/or areas that are expected to be of interest (e.g., because the POSS has determined that a security threat is likely in that object, region, and/or area. The brightness may be adjusted by scaling the brightness to span a larger range or a smaller range. Increasing the sample rate may involve increasing the FPS by adjusting the time between frames and/or introducing extra frames (that are extrapolated between the original frames that were captured. De-interlacing may—improve data merging between two interlaced frames so that the merged image has a higher resulting quality than if the de-interlacing were not performed. Better dithering may involve the system adding (e.g., by extrapolating) more levels of dither (e.g., more grey scale levels) and thereby create more variations of the data. By adding dithering, the resolution may increase by two to four times.

Detection and Processing Engine:

After the preprocessing, the Automatic Detection, Classification, and Processing Engine may process the data. The pre-processed sensor data may be piped to the detection and classification engine. The detection and classification engine may detect the person in the scene, may detect the objects on the person, may classify the objects detected based on the characteristics and/or behavior of the object and/or person.

The detection and classification engine may perform a series of algorithms to detect and/or classify the object and/or people detected. The output of these engines are the objects detected and/or one or more events that are expected to be of interest, such as because the output is expected to be events and/or objects that are security threats.

Events

In an embodiment, the POSS system generates three types of events, such as warnings, alarms, and manual events. There may be different types of alarms, such as there may be a special alarm for large objects. A warning may indicate a potential threat, which may be a person event or object that has a higher likelihood of being a threat than a particular threshold, but does not meet the criteria for setting an alarm. Alarms may indicate a small size object on a subject's body. There may be an Alarm that is activated when a large object is detected on a person. In other words there may be multiple types of alarms, which may include an alarm for large objects and another alarm for smaller objects.

Manual Event may be events that the POSS records manually. There may be a user interface provided for recording manual events. Whenever the operator sees a situation that is not expected to be automatically the event may be recorded as a result of manual input received form the user indicating to record the event.

Events may have a variety of information as part of the data that is recorded and/or stored in association with the event. For example, the date and time, the object location, the object size, the confidence values that a classification of the event is correct, the object classification, the event classification, an approx location on the body (chest, back, etc) where an object was detected, the degree to which a material reflects light, the degree to which a material absorbs light (which may be an indication of the type of material, such as whether the material is metal, ceramic, or plastics), the degree to which a material reflects sound, the degree to which a material absorbs sound, and/or duration that an object appears within the data. The information stored with the data may include a variance of the object and/or deviations of the object as compared to an expected object type and/or computed from a histogram of the data points. The information stored may include a quantification of the amount of variation in the data. The information may include an identification and/or image of the host/person carrying an object of interest. The information may include the face of the user, the size of the information, the time that the data was collected, the color of the person. Information may include tracking information that tracks, the origin, the path, and/or the location of a person or object throughout a series of frames. With the above object, event, and user information, the data can be searched more easily than without the above information.

In an embodiment, each generated event is saved in a database along with the video and MMW (or IR or THZ) snapshots at the time of event. In an embodiment the POSS can detect multiple objects simultaneously for each frame and generate multiple events per frame. In an embodiment, the events are shown on a screen of a monitor and are also sent to detection algorithms and/or hardware for generating alarms. In an embodiment, there are specific color codes assigned to the events that facilitate understanding the status of the event.

Output

In an embodiment the POSS can generate various types of outputs for monitoring and review. For example, the POSS may generate HTML reports that create HTML reports for generating and/or identifying events. In an embodiment, the report has date/time of each event, type of event and screen shots. In an embodiment, these reports can also be viewed remotely from a remote client or any other machine through a web browser. For enabling the remote view of reports from browser, in an embodiment, the POSS uses its own web server.

In an embodiment, the events are saved in a database, which can be searched with various criteria. The detection parameters at the time of events may also be saved to the database. In an embodiment the POSS produces network that enables video streaming and event streaming to remote clients and/or network video recorders.

In an embodiment, the POSS can store and archive sensor or video data for only data that is associated with what the POSS identifies as an event and/or continuously archive all data. In an embodiment the POSS may store one archive that includes all data and another archive that only has data related to what has been identified as an event. In an embodiment, the user may be provided with tools for selecting an output type. For example, the use may be able to select between text, PDF, or spreadsheet outputs.

Configuration and Settings

In an embodiment, all the settings for detection, saving data to a database save, and/or displaying data on a monitor can be exported to a settings file. The setting file can be imported into POSS. Consequently, there may be various preexisting settings files that correspond to types of environments, which can be, imported whenever required. By having settings files, POSS can be restarted and brought back to the same or a prior set of settings or configuration quickly and easily. Also factory settings can be restored quickly by storing the factory settings in a file and loading the factory settings when desired. In addition, configuration settings or default parameters can be transferred from one machine to another similar machine.

Sensor Fusion

In an embodiment, sensor data can be fused for multiple purposes. In an embodiment, sensor data can be fused for at least four purposes. For example, the user may be provided with an option of viewing the output of all or multiple sensors simultaneously. As another example, sometimes the different sensors have different, but valuable information. Hence cross correlating the sensors and/or stored information (e.g., stored information about the region being observed, the people, possible hidden objects and/or other information), can help detection and the increase accuracy of detection. As another example, checking multiple sensors and using multiple sensors to collect data can make the system more robust and easier to troubleshoot if a problem arises. As another example, it may be desirable to synchronize data while recording, such as synchronizing the sound and video or other data.

The fused image may be displayed. An operator may want to see the results on Video in the visible spectrum. Since some of the detection is performed using other types of sensor data (e.g., MMW or THZ), the detection may be performed on a different space than the visible space and converted to the visible space. The results or objects fused may displayed on the visual or video stream. To perform the synchronization, an initial spatial calibration and configuration may be done. For example, the location of the sensor with respect to the other sensors may be calibrated. Then the objects detected at one sensor can be displayed as if detected by another sensor and/or the image at one sensor may be enhanced with the image data of another sensor by using the transformation or mapping that converts the image from one camera to an image viewed from the perspective of another camera. The mapping for transforming image data or sensor data from one camera or sensor into an image or data from another camera or sensor may be used for cross correlation between sensors and/or cameras.

The other sensor fusion is for detection and processing. In an embodiment, no one sensor has all of the information about an event or object. Hence, it is useful to combine and/or compute the likelihood or a security based on the diverse information from multiple sensors, thereby increasing robustness and reliability of the determination of a security threat.

Database Search

In an embodiment, events and/or other data may be saved in the database in a format that can be searched according to various criteria. For example, it may be possible to search for a time associated with an event. In an embodiment, it may be possible to search all events that occurred in last N minutes, hours, or days, where N is a number specified by the user. Similarly, user may be given tools for searching fore events that occurred in a particular time frame. The user may also be given the tools for searching for a particular type of event, object, and/or person. For example, the user may be able to search for certain events, such as all events or videos having hot objects in them. The user may be given tools for searching for a particular location associated with an object, person and/or event. The user may be given tools for searching for characteristics of an object. The user may be provided with tools for searching for information associated with a person, such as the person's name and/or face. User may be able to search for data associated with (e.g., taken by or processed by) a particular device or application connected t the POSS. Searching for a particular device or application that is associated with the data may be useful when the POSS includes multiple systems connected to a single recorder. In an embodiment, search capabilities for searching for a video having a particular person in it. In an embodiment, the person's, name, face, type of object, type of event may be keys (e.g., searchable columns) in the database.

Once the record is found through search, the network video recorder can be queried for the portion of the video recorded in a particular time frame and/or having a particular set of desired characteristics. Thus, the user can view the part of video for the searched record.

Data Analysis and Measurements

In an embodiment, the POSS may provide the ability to analyze sensor data for fine tuning application. The application will allow measure sensor or visual data in both manual and automatic mode. User can point to any pixel or location or person or area and measure the summary, temperature range, sizes, distances, etc.

In an embodiment, a color code for sensor values is established for viewing sensor data. For example, each color may correspond to a different temperature or energy pattern or temperature or energy range.

Figure 11:
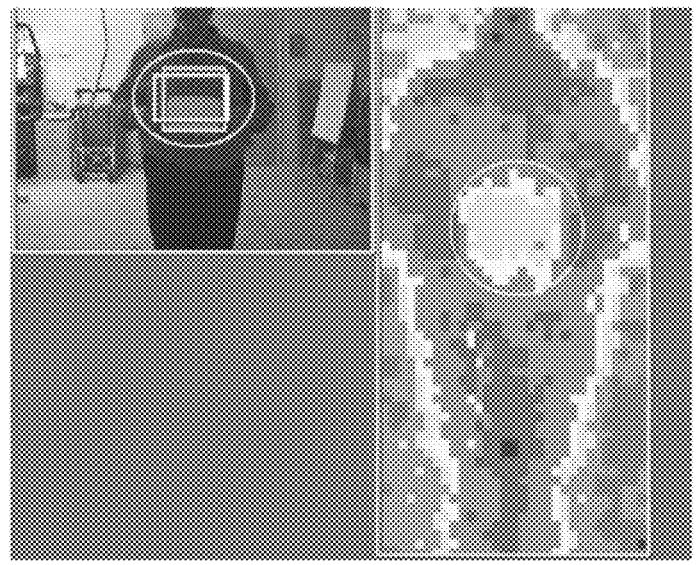
FIG. 11 shows an example of a screenshot of color coded data.
Figure 12:
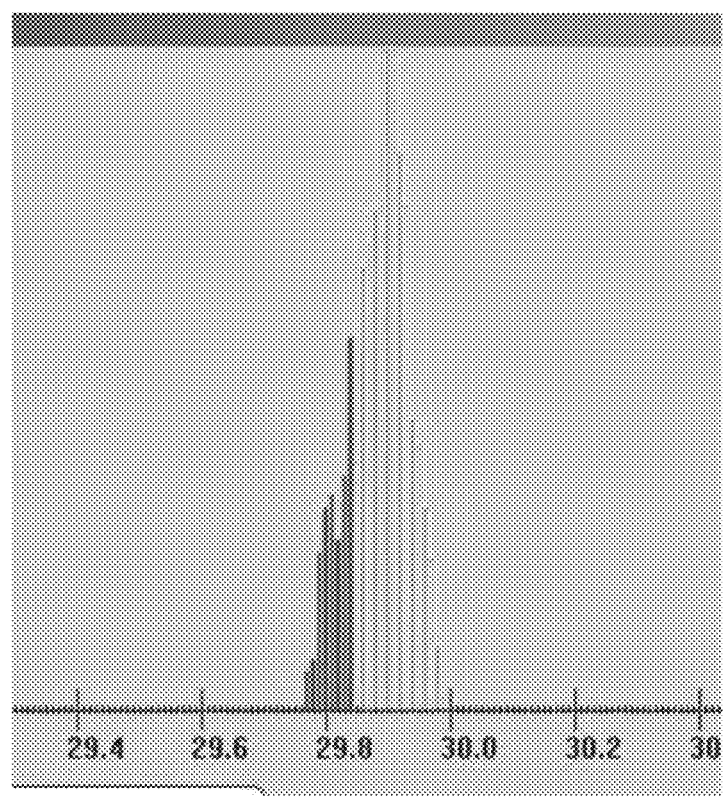
FIG. 12 shows an example of a screenshot of a histogram of the data from FIG. 11.

In an embodiment, the POSS may display a histogram of the detected image. FIG. 11 shows a screenshot of an image in which the non-encircled areas shaded in medium and dark gray represent a person and the encircled, light gray area represents a detected weapon. FIG. 12 shows an example of a histogram of the data from FIG. 11.

Client-Server Architecture

In an embodiment, the POSS may include a remote monitoring and control of sensors and cameras. For example, the POSS may be monitored and partly controlled by a remote client. The remote client may connect to the main portion of the POSS and get a corresponding view (e.g., for the same location and perspective) from an MMW, Video, and/or other sensor. In an embodiment, various detection parameters can be set from the remote client. For example, the remote clients perform the database search on the server database.

In an embodiment, the POSS application server streams the video and MMW view via UDP protocol, TCP/IP protocol, and/or another client/server protocol. In an embodiment, the client sends various commands as an XML string to the server. The server processes the XML strings and sets the appropriate parameters on server side.

Multiple Server Connections

In an embodiment, the remote client can connect to multiple servers simultaneously. Connecting to multiple servers gives the operator ability to monitor all POSS applications and hardware from one machine. Also the multiple server POSS allows the POSS to be controlled from a single machine.

Audio Streaming Ability

In an embodiment, operators watching the POSS system remotely can talk to an operator working at the server machine. In an embodiment, the POSS has the ability for two-way audio communication between the server and client.

System Client-Server Architecture

Figure 13:
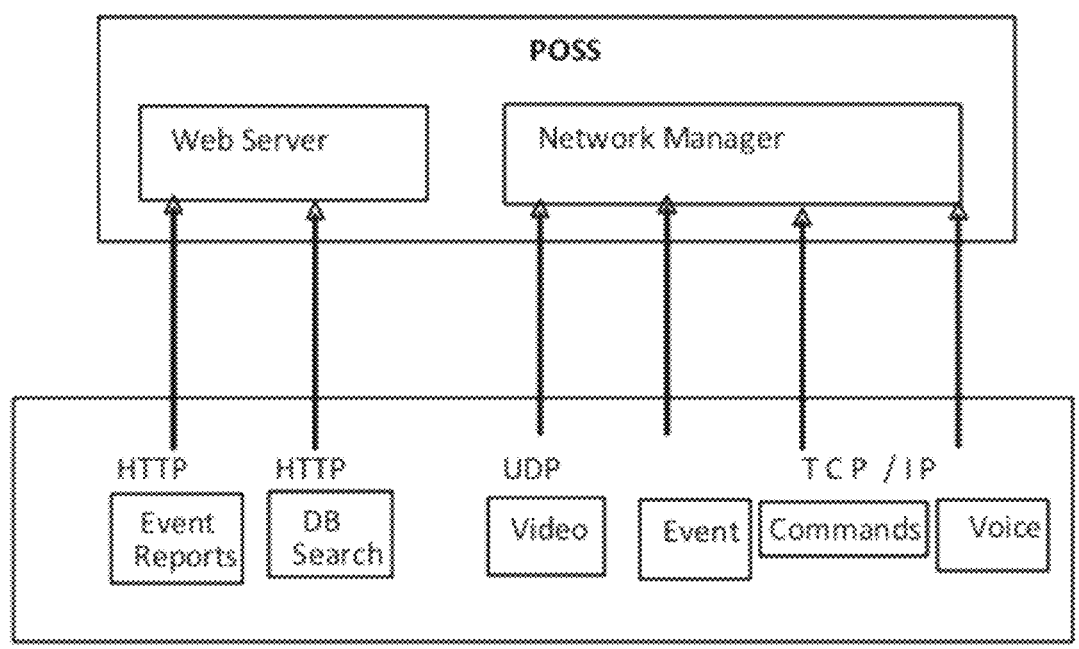
FIG. 13 shows a block diagraph of an example of the server-client architecture of the POSS.

FIG. 13 shows a block diagraph of an example of the server-client architecture of the POSS, discussed above.

Video Recording

The system may also be integrated within a video recording system. In an embodiment, the video recording system records only videos of what the POSS identifies as events so that the user only needs to view and/or analyze videos that are expected to have problematic and/or potentially problematic.

The video recording system may have a variety of features. For example, the video recorder may be viewable on a device or application. Alternatively or additionally, the output of the video recording system may be viewable on a different server on the network. The application sends the events data to the video recorder along with the video frames. The event data is saved in a database and can be searched later. In and embodiment, multiple applications can be connected to a single video recording system, and all of the data can be displayed on a single server. In an embodiment, the recorded videos can be replayed and can be searched based on various parameters, which may be the same as those discussed in connection with searching the database.

Figure 14:
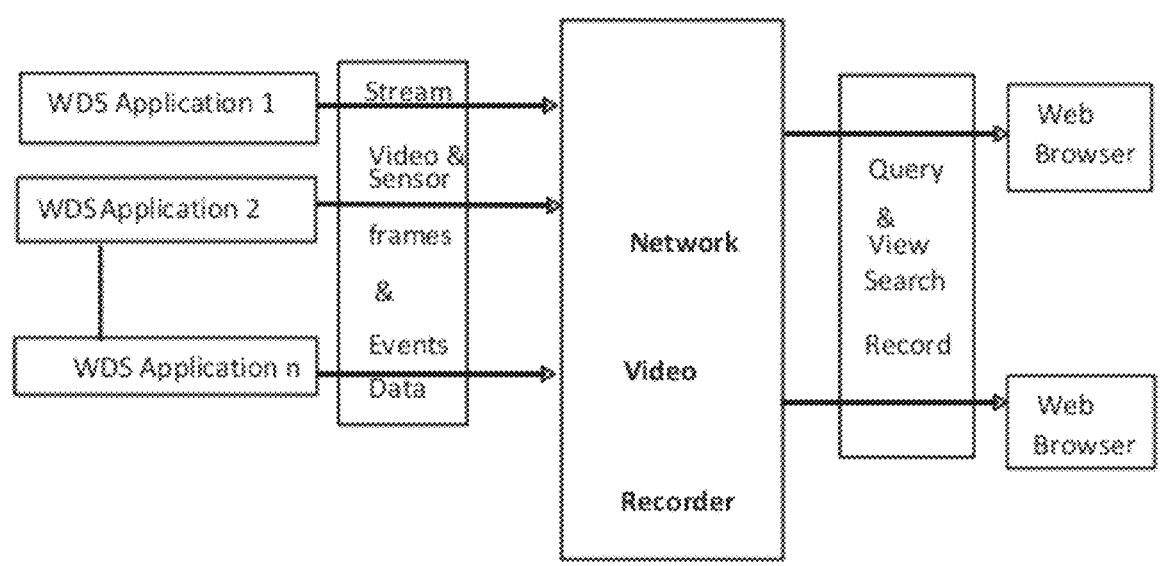
FIG. 14 is a block diagram of an example of a system for searching the video recorder of a POSS.

In an embodiment, the data recorded in the video recorder (of the POSS) can be searched from a remote machine from a web browser. Also the videos can be viewed from a web browser. Searching and remote browsing can be based on events, objects, a person, database events or information stored, video archived, as discussed in connection with database searching. FIG. 14 is a block diagram of an example of a system for searching the video recorder of a POSS.

SDK/API for Remote Monitoring

Figure 15:
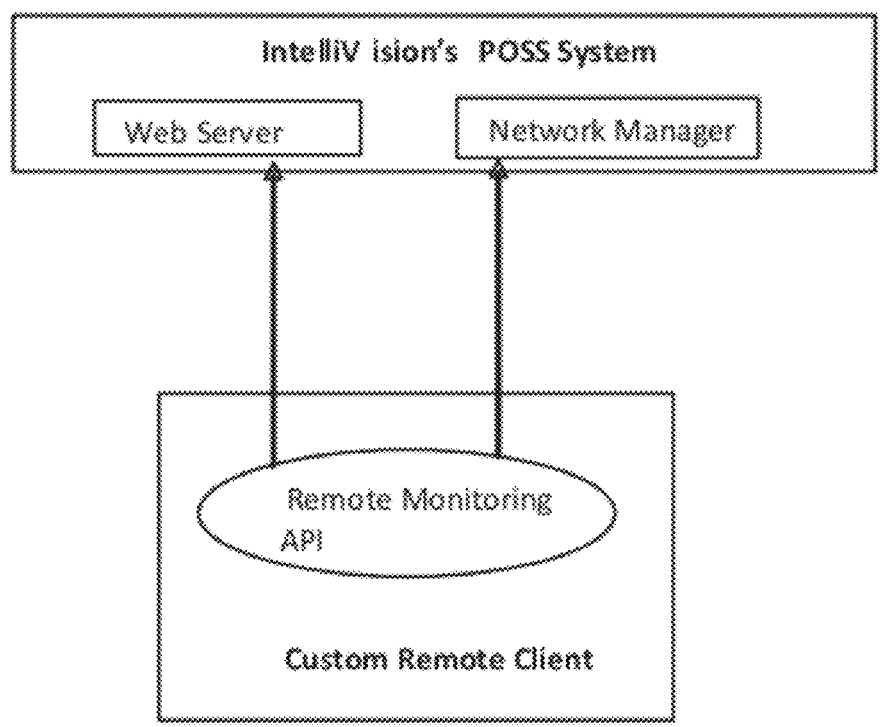
FIG. 15 is a block diagram of an example of an API/SDK for the POSS.

In an embodiment, the system is provided with an API for remote monitoring and control of the system server application. Using the API, any vendor can write his own remote client, which can monitor and control the system or the server built in the system. In an embodiment, the API is a C++ API, which has several methods. For example, the API may include a method for getting a frame-by-frame processed video, getting frame-by-frame processed MMW or other sensor data, getting event labels for each frame, and/or sending control commands to the system. In an embodiment, the API may have several control commands, which are various detection related settings, such as view the sensor status (e.g., the frame rate, temperature, deviation of the temperature) and/or commands for querying the server database. FIG. 15 is a block diagram of an example of an API/SDK for the POSS.

Network Video/Sensor Recorder Application (NVR)

The NVR can be a separate external application that connects and integrates with the POSS or is built inside the POSS. The NVR may also be capable of recording the raw or compressed MMW or other sensor data as obtained from sensors. The NVR enables the users to analyze the data at a date later than when recorded. Recording the raw or compressed data can also be helpful in fine-tuning the application. Users can record the raw data and try out various settings on the raw data to check which settings are likely to give better, or more accurate, detection results.

In an embodiment, the NVR can also record the raw or compressed video data as obtained from sensors. The NVR enables users to analyze the data later. The application can also be helpful in fine-tuning the application. Users can record the raw data and try out various settings on the raw data to check which settings can give better, or more accurate detection results.

Face Detection and Recognition

Face detection and recognition can be a separate external application that connect and integrates with POSS or built inside POSS. In an embodiment, since POSS also uses live video along with the MMW sensors for detection, integrating the live video and MMW data facilitates the detection and recognition of faces. The video and sensor data may be available over the network or on the same camera. Face Detector and Recognizer applications may be applied to the video and sensor data. Ina ne embodiment, even if multiple faces appear in front of a camera simultaneously, the face detection and recognition application may be capable of picking up and detecting all of the faces seen by the camera. In an embodiment, the face detection and recognition application will detect faces in the video and can match the faces with the database of faces.

In Camera Processing and Recording

The system can further be extended to be embedded inside the system or cameras. Video recorder board can also be embedded inside the POSS systems or cameras. The cameras may be capable of recording the data whenever there is an event detected. There can be a storage device attached to the camera on which the videos can be saved.

The camera may have a variety of processing onboard. For example, the camera may include a processing engine, which takes the data captured by sensors, performs a video analysis and generates the portions of the input data that was determined to be an event. The camera may include a video recorder module that records the data about events in association with the event corresponding to the data. The camera may include a network output module, which may facilitate streaming video and events to various remote clients on a network. The camera may include a web server, which may provide a user interface for setting detection parameters and/or other parameters. The web server may allow the user to view events in real time. The camera may include searching for recorded videos. The camera can be connected to various mechanical devices for activating (e.g., firing) alarms in case a threat situation is detected.

Object Detection Using Front and Back Cameras

The POSS may also be connected to two systems or cameras one on the front side of the person and the other on the backside of the person. So, that a person being inspected can just walk without turning around and the POSS can still detect the person and objects on both sides of the person. This embodiment may be constructed from two systems or one system having two cameras or two sensors—one looking at the front view and one looking at the rear view of the subject. Hence the whole person can be covered simultaneously from two views. The two images can also be displayed simultaneously from two views.

Remote Control

Figure 16:
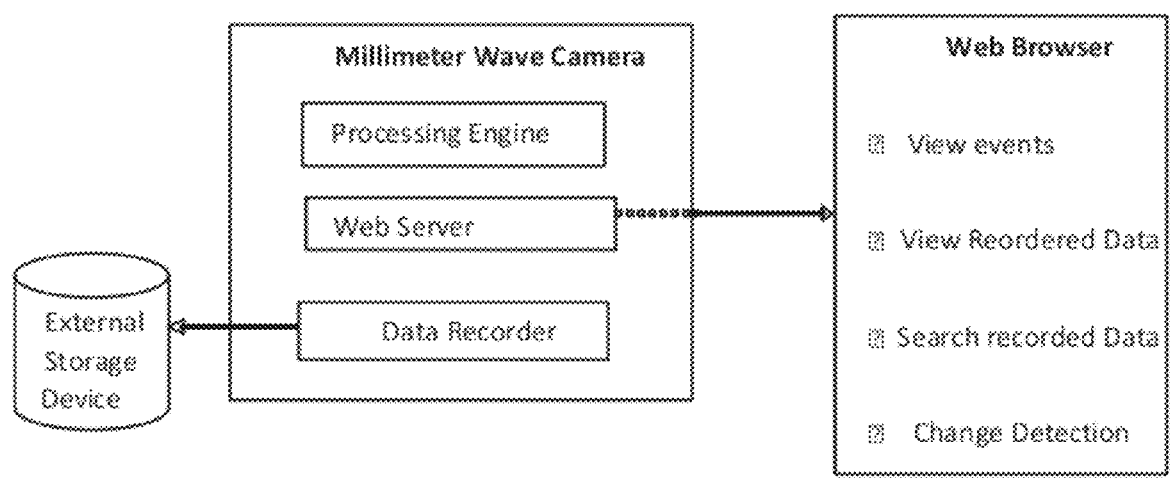
FIG. 16 shows a block diagram of an example of POSS that can be controlled remotely.

Since the processing board has a web server embedded on it, the camera can be remotely controlled through a web browser. User can connect to the camera from browser and change the detection/storage related settings. FIG. 16 shows a block diagram of an example of POSS that can be controlled remotely.

Video Panorama in POSS

In many cases for indoor or outdoor scenes, the Field of View (FOV) of a system or camera can be limited and hence the whole scene can not be seen or monitored. Hence to cover the whole scene, the user will have to deploy 2 or more cameras and/or two or more of other sensors. When the POSS is processing multiple cameras, then it may be desirable to treat both the views single view. The advantage of treating both views as a single view is because both cameras or other sensors may inspect same person. To facilitate treating multiple sensors as a single view, the output of separate cameras or sensor may be stitched together. In the case of image data or other data, a panorama view may be formed by the POSS. The stitched data can be used for detection, streaming and display. Video and/or sensor panorama allows the user to join multiple scenes to form and view a much larger scene. The final result can be treated as one or many scenes.

Figure 17:
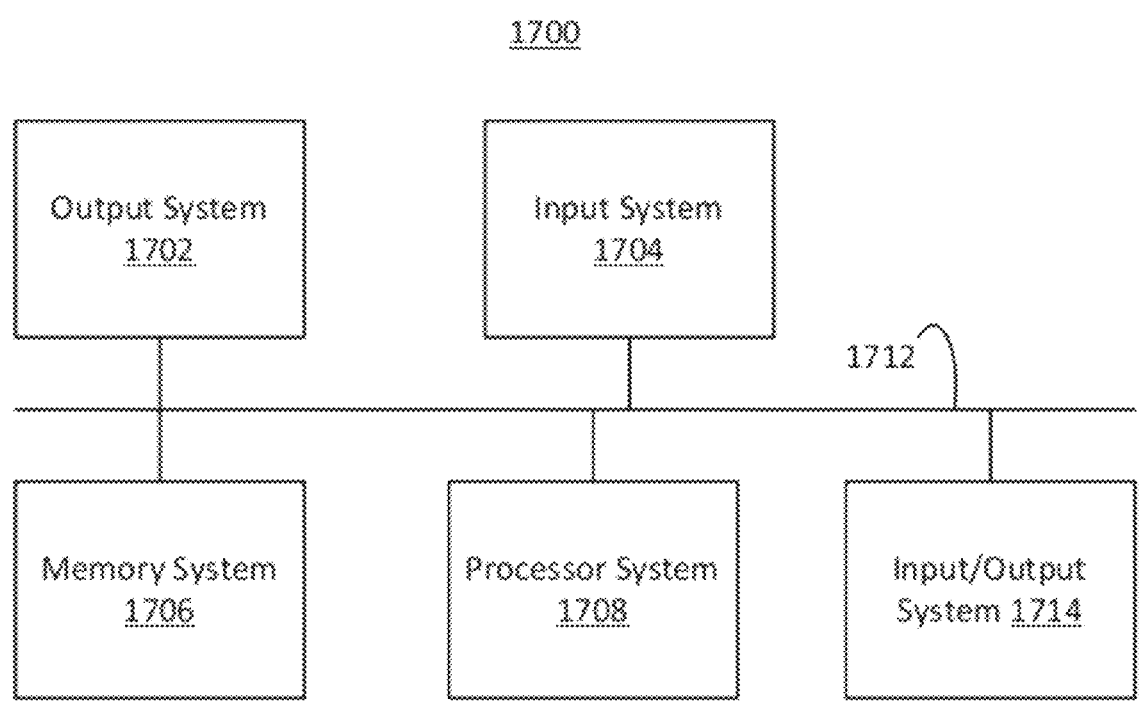
FIG. 17 shows a block diagram of an embodiment of another level of POSS 1700 that may be used in any of the embodiments of described in this specification, e.g., in FIGS. 10A-17.

FIG. 17 shows a block diagram of an embodiment of another level of POSS 1700 that may be used in any of the embodiments of described in this specification, e.g., in FIGS. 10A-17. The POSS may include output system 1702, input system 1704, memory system 1706, processor system 1708, communications system 812, and input/output device 814. In other embodiments, POSS 1700 may include additional components and/or may not include all of the components listed above.

POSS 1700 is an example of any of the POSSs discussed above, which may be located within a camera, recording device, or may be and external computer controlling peripheral camera and/or other sensors and/or monitors of the POSSs discussed above.

Output system 1702 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. Output system 1704 may include the user interface of FIG. 10B.

Input system 1704 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 1704 may include any of a variety of cameras and/or other sensors, such as a MMW and/or a temperature sensor, as discussed above.

Memory system 1706 may include, for example, any one of, some of, any combination of, or all of a long term storage system, such as a hard drive; a short term storage system, such as random access memory; a removable storage system, such as a floppy drive or a removable drive; and/or flash memory. Memory system 1706 may include one or more machine-readable mediums that may store a variety of different types of information. The term machine-readable medium is used to refer to any medium capable carrying information that is readable by a machine. One example of a machine-readable medium is a computer-readable medium. Memory system 1706 may include program memory for storing the applications that run POSS 1700 and data. Memory 1706 may include applications for analyzing and displaying data. Memory 1706 may include a database and database server for storing and retrieving information captured, stored, and/or analyzed by the POSS. Memory 1706 may include a web server for communicating with monitors, an operator, cameras, microphone, MMWs, temperature sensors and/or other sensors that are remotely located. Memory 1706 may include drivers for controlling the sensors, MMWs, cameras, and/or monitors, for example.

Processor system 1708 may include any one of, some of, any combination of, or all of multiple parallel processors, a single processor, a system of processors having one or more central processors and/or one or more specialized processors dedicated to specific tasks. Also, processor system 1708 may include one or more Digital Signal Processors (DSPs) in addition to or in place of one or more Central Processing Units (CPUs) and/or may have one or more digital signal processing programs that run on one or more CPU. Processor system implements the software in memory system 1706.

Communications system 812 communicatively links output system 1702, input system 1704, memory system 1706, processor system 1708, and/or input/output system 814 to each other. Communications system 812 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 814 may include devices that have the dual function as input and output devices. For example, input/output system 814 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 814 is optional, and may be used in addition to or in place of output system 1702 and/or input device 1704.

Further Discussion

To reiterate some concepts discussed above, the client operations may involve the server or main system being with/inside the camera computer. There may be a CPU/PC inside the camera. There may be a remote server, in which the PC or CPU resides outside the Camera similar to a network camera. Most processing happens outside the camera on a PC on the network, similar to a remote server.

The client may be a remote PC, any browser, or client. Remote clients may be capable of performing many tasks, such as setting up and configuring camera, review results, view events and/or reports, view problem images, problem people, and/or problem videos. In an embodiment, the main system can ask the remote client for approval or confirmation.

Regarding examples of what detection settings an administrator can and cannot access, there may be different user levels or privileges. In and embodiment, the highest level of access is that of an administrator, and the lowest level of access is that of a user/viewer.

In an embodiment a user having the administrator levels can create and setup user names and passwords. The administrator may be capable of controlling settings related to detecting events, such as the object size, time period during which the object should be visible or present, the number of frames necessary to validate an event, where an object should be found to be considered a security threat, and where on the body an object can be ignored and not considered a security threat. The administrator may determine how much contrast is necessary to identify a particular type of object. The Administrator may determine whether a subject being screened should stand, move, or rotate 360 degrees for a screening process. The Administrator may also determine report settings for events.

The term Auto Detection Engine refers to the software and/or hardware that automatically makes a determination as to whether an object or event is detected. The manual detection engine are the software and/or hardware made available to the user to manually analyze whether an event is a security threat, to record event, and to determine a response to the event (if any).

An event may be the detection of any abnormality, which may be an abnormal object, item or other events. For example, an event can be an object or IED found on the person. An event can be a person that is missing part of the person's body. An event may be a person having an abnormal MMW energy pattern or abnormal movement pattern.

A Face Detection algorithm may include searching for features that characterize the shapes or other features of the eyes, the nose, the mouth and/or other facial features. In an embodiment, visible (face) detection is performed by the video-visual camera data and MMW only detects energy, and MMW waves, which are displayed and manner similar to heat patterns.

Once a face is detected, then a Face Recognition can be performed. Which may involve searching for facial fingerprints or signatures. The signatures of various people may be stored and compared to determine whether a face detected matches a face sotred, which may be performed using a visual camera. An MMW Energy pattern of a face may also be used as a body signature to further aid in determining whether a face detected matches a stored face. The terms "total solution," and "full or solution," refer to the entire system, which is often referred to as the POSS.

On example of an embodiment, is the system of claim 1 the one or more sensors including multiple sensor system, the memory system storing one or more instructions, which when implemented by the processor, cause the process to of join output from multiple sensors of the sensor system to form a panorama view for a wide angle coverage or simply 2 camera system (at 180 degrees) to look at front and back of a person (or) a 4 camera system each at 90 degrees to look a person from all 4 sides.

Another example of an embodiment, is a remote Client or Server system that is connected to the POSS system, where the client can be used for any of the following: Viewing, setup, configuration or seeing summary/reports etc. A remote server or processor can be used, if the camera can be made smaller with less CPU or power and the CPU and more processing to moved to another node on the network. That server can process or handle one more POSS system for remote processing.

Another example of an embodiment is the POSS system can also add other detection and analysis modules using its regular color camera to do general purpose intelligence such as: Intrusion detection, People Counting, Object left behind by people, Camera Tampering, People Loitering, abnormal running or crowd gather etc. Audio detection can be used to detect abnormal sounds like shouting, yelling etc as part of the POSS system.

Another example of an embodiment is the system that can used both in Manual and automated mode. A manual mode where the operator is more in charge and system is purely giving data and operator decides the final results (with less auto detection features). Or used as a fully or partially automated system, where system automatically detects and prompts operators or remotely alerts people on abnormal events and situations or IEDs found on people or ground.

Another example of an embodiment is the software & System Architecture of POSS, where there is one or more of these components:

Sensor input system (one or more)
Sensor pre-processing component/sub-system
Auto Detection: IED and Object detection component/sub-system
Sensor fusion of one more sensors
Sensor post-processing to reduce false alarms and improve results and display
Display component/sub-system
Event and Alerting component/sub-system
Recording and saving, Storage component/sub-system
External communication and interface component/sub-system
API/SDK for external system integration component/sub-system
User interface and Human-machine-Interface HMI component/sub-system
Additional add-on detection and analytics components There is a visible (color) camera (and used as IR at night) as part of the POSS system. This camera can do other detection and analysis in parallel to the IED and object detection on people. This visual/IR camera can use CPU processing power and do video processing to perform video intelligent or analysis such as:

a. Intrusion Detection—If any person intrusion into the area
b. Counting—Count the number of people
c. Camera Tamper—Is the camera working okay or tampered with
d. Loitering—is any person loitering and waiting around
e. Crowd gathering—is there a crowd gathering
f. Abnormal activity—is there any abnormal event like running, wrong direction etc. Using Audio sensor as part of POSS to detect Shouting, yelling—Using mic, use audio detection to hear shouting or abnormal sound. All these will go as events out of the POSS system. They can also be recorded and analyzed later.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A hardware system comprising:
one or more sensors, which includes a sensor to capture video frames;
a processor system having one or more processors;
a memory system storing one or more machine instructions, which when implemented cause the processor system to perform a method including at least:
processing data from the sensors;
determining, via the processor system, whether a pixel is part of a foreground portion of an image based on a current video frame;
determining, via the processor system, a first set of unknown pixels for which being located in the foreground portion does not in-and-of-itself determine the pixel to be part of the foreground;
determining, via the processor system, whether the pixel is part of a current background portion of the image based on the current video frame;
determining, via the processor system, a second set of unknown pixels for which being in a current background portion does not in-and-of-itself determine the pixel to be part of the background;

determining, via the processor system, for the first and second set of unknown pixels whether the pixel is part of the background or foreground is based on temporal data; and extracting, via the processor system, an image of the foreground that does not elude the current background based on the determining of whether the pixel is part of the foreground, based on the determining of whether the pixel is part of the current background and based on the temporal data.

2. The system of claim 1 further comprising a hardware output system, the memory system storing one or more instructions for joining data from two or more sensors, and fusing the sensor data into a format for viewing data from both sensors simultaneously on a monitor, and sending the sensor data to the monitor.

3. The system for claim 1, the system being capable of connecting and providing add-on solutions including one more of remote processing, recording, face detection or search solutions.

4. The system of claims 1, the one or more sensors including at least a camera, the system having a flexible architecture for providing add-on solutions inside the camera or outside camera on a network.

5. The system of claim 1 the memory system storing one or more machine instructions, which when implemented, cause a processor and one or more units to detect whether an event is a security risk, manage events, and search events.

6. The system of claim 1 the one or more sensors including multiple sensor system, the memory system storing one or more instructions, which when implemented by the processor, cause the process to join output from multiple sensors of the sensor system to form a panorama view for a wide angle coverage.

7. The system of claim 1, the method further including at least:
   determining a motion associated with regions of the image; and
   determining which pixels are background pixels based on whether the motion is within a range of values of motion that is expected to be associated with the background.

8. The system of claim 1, the foreground being one or more images of one or more people and determining the foreground pixel includes at least determining whether the pixels have a coloring that is expected to be associated with the one or more people.

9. The system of claim 8, the coloring including a hue associated with skin.

10. The system of claim 1, the method further including at least determining regions to be part of the background, based on the regions having a motion that is less than a particular amount, and updating the background based on the determining of the regions.

11. The system of claim 10, the method further including at least the updating of the background including changing pixel values of background pixels to indicate changes in lighting associated with the background.

12. The system of claim 1,
   the extracting of the image of the foreground including a first phase and a second phase,
      the first phase including at least
         classifying pixels having a first range of motion values as background pixels
         classifying pixels having a second of range of motion values as foreground pixels, the first range does not overlap the second range,
         undetermined pixels, which are pixels having a motion value that is not in the first range and not in the second range, are not classified as background or foreground as part of the first phase; and
      during the second phase, classifying the undetermined pixels as background or foreground based one or more other criteria.

13. The system of claim 1, further comprising:
   determining a complexity for one or more regions of a scene, and
   adjusting one more criteria for determining whether a pixel is a background or foreground pixel, based on the complexity.

14. The system of claim 1, the method further including at least
   determining whether the data indicates a security threat,
   tracking a particular entity,
   activating an alert in response to determining that the data indicates a security threat, and
   storing the data.

* * * * *